United States Patent [19]
Itoh et al.

[11] Patent Number: 6,060,860
[45] Date of Patent: May 9, 2000

[54] CONTROL APPARATUS FOR VARIABLY CONTROLLING SPEED INDUCTION MOTOR

[75] Inventors: Junichi Itoh; Hidetoshi Umida, both of Tokyo; Hiroyuki Yonezawa, Mie, all of Japan

[73] Assignee: Fuji Electric Co., Ltd., Kawasaki, Japan

[21] Appl. No.: 09/271,322

[22] Filed: Mar. 18, 1999

[30] Foreign Application Priority Data

Apr. 3, 1998 [JP] Japan ................................. 10-091303
Jun. 17, 1998 [JP] Japan ................................. 10-169936

[51] Int. Cl.$^7$ ............................. H02P 1/30; H02P 7/36; H02M 7/48
[52] U.S. Cl. ........................ 318/809; 318/801; 318/810; 318/811
[58] Field of Search .................... 318/138, 439, 318/448, 729, 799–833; 363/34, 39, 41

[56] References Cited

U.S. PATENT DOCUMENTS 5,731,681 3/1998 Inaniwa et al. ......................... 318/729
5,811,949 9/1998 Garces ................................... 318/448

FOREIGN PATENT DOCUMENTS 7-250496 9/1995 Japan .
8-130882 5/1996 Japan .

Primary Examiner—Paul Ip
Attorney, Agent, or Firm—Kanesake & Takeuchi

[57] ABSTRACT

A control apparatus for variably controlling a speed of an induction motor includes a voltage generator, adders, a rotating speed calculating device, a rotating direction detecting device, and a multiplier. The voltage generator is operated for a predetermined period of time at the start or restart of the induction motor to cause self-excited oscillation in a control system including the voltage generator, the induction motor and the PWM inverter. The rotating speed calculating device obtains the rotating speed data, and the rotating direction detecting device detects the rotating direction of the induction motor based on the α- and β-axis components, on the stationary coordinate, of the primary current of the induction motor. And, the PWM inverter is started based on the obtained rotating speed data and rotating direction. The control apparatus facilitates starting the PWM inverter that supplies electric power to the induction motor or restarting the PWM inverter after the AC electric power supply to the PWM inverter has recovered from a momentary service interruption.

24 Claims, 19 Drawing Sheets

CONTROL APPARATUS FOR VARIABLY CONTROLLING SPEED INDUCTION MOTOR

BACKGROUND OF THE INVENTION AND RELATED ART STATEMENT

The present invention relates to a control apparatus for variably controlling a speed of an induction motor including a PWM inverter for converting a fed AC power supply to an alternating current having a desired frequency and a desired voltage and for feeding the converted alternating current to an induction motor so that the speed of the induction motor may be controlled variably without using any speed sensor. More specifically, the present invention relates to a control apparatus for variably controlling a speed of an induction motor that facilitates starting the PWM inverter with a high reliability or restarting the PWM inverter with a high reliability after the AC power supply has recovered from a momentary service interruption. Hereinafter, the control apparatus for variably controlling the speed of the induction motor will be sometimes referred to simply as a "speed-control apparatus".

Japanese Unexamined Laid Open Patent Publication (KOKAI) No. H08-130882 discloses a method of controlling a speed of an induction motor.

FIG. 18 is a block diagram of the conventional speed-control apparatus of an induction motor disclosed in the above described patent application.

Referring now to FIG. 18, the reference numeral 1 designates an induction motor, 2 a PWM inverter, 3 a current detector and 10 a speed-control apparatus. The speed-control apparatus 10 includes a speed control system 11, a magnetic flux control system 12, a current control system 13, two-phase three-phase converting means 14 and three-phase two-phase converting means 15, which are constructed by the conventional techniques. For starting the PWM inverter 2 or for restarting the PWM inverter 2 after an AC power supply (not shown) has recovered from a momentary service interruption, the speed-control apparatus 10 also includes a signal generator 16, adders 17a and 17b, magnetic flux estimating means 18 and frequency calculating means 19.

In the speed-control apparatus 10 shown in FIG. 18, the fundamental equation of the induction motor 1 rotating at an angular frequency $\omega_2$ is expressed on the stationary coordinate having $\alpha$-axis and $\beta$-axis by the following equation (1).

$$e\alpha = s \cdot \Phi\alpha$$
$$e\beta = s \cdot \Phi\beta$$
$$0 = -R_2 i\alpha + (s+1/T_2)\Phi\alpha + \omega_2\Phi\beta$$
$$0 = -R_2 i\beta + (s+1/T_2)\Phi\beta - \omega_2\Phi\alpha \quad (1)$$

Here, $e\alpha$ and $e\beta$ are $\alpha$-axis and $\beta$-axis components of the induced voltage of the induction motor 1; $i\alpha$ and $i\beta$ are $\alpha$-axis and $\beta$-axis components of the primary current of the induction motor 1; $\Phi\alpha$ and $\Phi\beta$ are $\alpha$-axis and $\beta$-axis components of the magnetic flux of the induction motor 1; $R_2$ is a conversion value on the primary side of the secondary resistance of the induction motor 1; $T_2$ is a secondary time constant of the induction motor 1; and s is a differential operator for Laplace transformation.

The above equation (1) is described by the functional block diagram described in FIG. 19. From this figure, $\Phi\alpha$ and $\Phi\beta$ are expressed by the following equations (2) and (3), respectively.

$$\Phi\alpha = [R_2(s+1/T_2)i\alpha - \omega_2 R_2 i\beta] \div [(s+1/T_2)^2 + (\omega_2)^2] \quad (2)$$

$$\Phi\beta = [R_2(s+1/T_2)i\beta + \omega_2 R_2 i\alpha] \div [(s+1/T_2)^2 + (\omega_2)^2] \quad (3)$$

In the equations (2) and (3), the relation $(1/T_2)^2 \ll (\omega_2)^2$ is held in the ordinary driving mode in that the PWM inverter 1 converts the fed AC power supply to an alternating current having a desired frequency and a desired voltage and controls the speed of the induction motor 1 variably. Therefore, the vibrating frequency of the magnetic flux of the induction motor 1 rotating at an angular frequency $\omega_2$ is $\omega_2$.

That is, by feeding a primary current containing a frequency component $\omega_2$ to the induction motor 1 rotating at the angular frequency $\omega_2$ by the signal generator 16 and the adders 17a and 17b, a rotating magnetic field with the frequency of $\omega_2$ is generated in the induction motor 1.

In practice, the current detector 3 detects the primary current of the induction motor 1. The three-phase two-phase converting means 15 converts the detected current values $i_U$ and $i_W$ to $i\alpha$ and $i\beta$, i.e. the $\alpha$- and $\beta$-axis components on the stationary coordinate. The magnetic flux estimating means 18 estimates $\Phi\alpha$ and $\Phi\beta$ from the equations (2) and (3) by using the converted $i\alpha$ and $i\beta$, and the frequency calculating means 19 obtains the angular frequency $\omega_2$ from the estimated $\Phi\alpha$ and $\Phi\beta$. The obtained angular frequency $\omega_2$ is used as a rotating speed data (f).

For starting the PWM inverter 2 or for restarting the PWM inverter 2 after the AC power supply has recovered from a momentary service interruption, the speed-control apparatus 10 of FIG. 18 makes the signal generator 16 work for a predetermined period of time at first. Then, the speed-control apparatus 10 starts the PWM inverter 2 based on the rotating speed data (f) obtained during the foregoing predetermined period of time to avoid overload of the PWM inverter 2 at its start.

As explained above, the conventional speed-control apparatus feeds a primary current containing a frequency component $\omega_2$ using the signal generator 16 and the adders 17a and 17b. At this moment, the speed-control apparatus 10 obtains the rotating speed data (f) through the magnetic flux estimating means 18 and the frequency calculating means 19. Therefore, it is required for the current control system 13 to respond quickly. For preparing the required function of the current control system 13, it is necessary to employ an expensive high-speed microcomputer. For obtaining the rotating speed data (f) by the fast Fourier transform (FFT), it is necessary to conduct complex calculations.

In principle, the vibrating frequency of the magnetic flux of the induction motor is identical to the rotating angular frequency of the induction motor. Since the vibration amplitude of the magnetic flux decades with the secondary time constant ($T_2$) of the induction motor, the vibration amplitude decades relatively faster especially when the induction motor is rotating at a low speed. Due to the relatively faster decade of the vibration amplitude, it is sometimes difficult to obtain the rotating speed data (f).

In view of the foregoing, it is an object of the invention to provide a control apparatus for variably controlling a speed of an induction motor, wherein the foregoing problems are obviated.

It is another object of the invention to provide a control apparatus for variably controlling a speed of an induction motor, wherein a cheap or economical microcomputer can be used.

It is a further object of the invention to provide a control apparatus for variably controlling a speed of an induction motor, wherein rotating speed data (f) of the induction motor can be obtained by simple operation even when the induction motor is rotating at a low speed.

SUMMARY OF THE INVENTION

According to a first embodiment of the invention, there is provided a control apparatus for variably controlling a speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of a primary current of the induction motor to the induction motor based on the α- and β-axis reference voltages; and rotating speed calculating means. The rotating speed calculating means detects the frequency of either one or both of the α- and β-axis components of the self-excited and oscillating primary current of the induction motor, and calculates the rotating speed data of the induction motor based on the detected frequency to start the PWM inverter or to restart the PWM inverter after the AC power supply has recovered from a momentary service interruption based on the calculated rotating speed data.

According to a second embodiment of the invention, the control apparatus further includes a high-pass filter, through which the α- and β-axis components of the self-excited and oscillating primary current of the induction motor are inputted to the rotating speed calculating means.

According to a third embodiment of the invention, there is provided a control apparatus for variably controlling a speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; rotating speed calculating means, the rotating speed calculating means detecting the frequency of either one or both of the α- and β-axis components of the self-excited and oscillating primary current of the induction motor, and calculating the rotating speed data of the induction motor based on the detected frequency; and starting phase calculating means. The starting phase calculating means calculates a start timing or starting phase data of the PWM inverter based on either one or both of the α- and β-axis components of the primary current and the calculated rotating speed data to start the PWM inverter or to restart the PWM inverter after the AC power supply has recovered from a momentary service interruption based on the calculated start timing or the calculated starting phase data and the calculated rotating speed data. According to a fourth embodiment of the invention, the control apparatus further includes a high-pass filter, through which the α- and β-axis components of the self-excited and oscillating primary current of the induction motor are inputted to the rotating speed calculating means and the starting phase calculating means.

According to a fifth embodiment of the invention, there is provided a control apparatus for variably controlling the speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting the reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; rotating speed calculating means for detecting the frequency of either one or both of the α- and β-axis components of the self-excited and oscillating primary current of the induction motor, and calculating rotating speed data of the induction motor based on the detected frequency; and rotating direction detecting means. The rotating direction detecting means detects the rotating direction of the induction motor based on the phase relation between the α- and β-axis components of the primary current to start the PWM inverter or to restart the PWM inverter after the AC power supply has recovered from a momentary service interruption based on the calculated rotating speed data and the calculated rotating direction.

According to a sixth embodiment of the invention, the control apparatus further includes a high-pass filter, through which the α- and β-axis components of the self-excited and oscillating primary current of the induction motor are inputted to the rotating speed calculating means and the rotating direction detecting means.

According to a seventh embodiment of the invention, there is provided a control apparatus for variably controlling a speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; rotating speed calculating means, the rotating speed calculating means detecting the frequency of either one or both of the α- and β-axis components of the self-excited and oscillating primary current of the induction motor, and calculating the rotating speed data of the induction motor based on the detected frequency; rotating direction detecting means for detecting the rotating direction of the induction motor based on the phase relation between the α- and β-axis components of the primary current; and starting phase calculating means. The starting phase calculating means calculates the start timing or the starting phase data of the PWM inverter based on either one or both of the α- and β-axis components of the primary current and the calculated rotating speed data to start the PWM inverter or to restart the PWM inverter after the AC power supply has recovered from a momentary service interruption based on the calculated start timing or the calculated starting phase data, the calculated rotating speed data and the detected rotating direction.

According to an eighth embodiment of the invention, the control apparatus further includes a high-pass filter, through which the α- and β-axis components of the self-excited and oscillating primary current of the induction motor are inputted to the rotating speed calculating means, the rotating direction detecting means and starting phase calculating means.

According to a ninth embodiment of the invention, there is provided a control apparatus for variably controlling the speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; and a rotating speed calculating means. The rotating speed calculating means detects frequency of either one or both of the α- and β-axis calculation values calculated in the voltage generator, and calculates rotating speed data of the induction motor based on the detected frequency to start the PWM inverter or to restart the PWM inverter after the AC power supply has recovered from a momentary service interruption based on the calculated rotating speed data.

According to a tenth embodiment of the invention, the control apparatus further includes a high-pass filter inserted between the voltage generator and the rotating speed calculating means.

According to an eleventh embodiment of the invention, there is provided a control apparatus for variably controlling a speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; rotating speed calculating means, the rotating speed calculating means detecting a frequency of either one or both of the α- and β-axis calculation values calculated in the voltage generator, and calculating rotating speed data of the induction motor based on the detected frequency; and starting phase calculating means. The starting phase calculating means calculates a start timing or starting phase data of the PWM inverter based on either one or both of the α- and β-axis calculation values and the calculated rotating speed data to start the PWM inverter or to restart the PWM inverter after the AC power supply has recovered from a momentary service interruption based on the calculated start timing or the calculated starting phase data and the calculated rotating speed data.

According to a twelfth embodiment of the invention, the control apparatus further included a high-pass filter inserted in the paths connecting the voltage generator with the rotating speed calculating means and the starting phase calculating means.

According to a thirteenth embodiment of the invention, there is provided a control apparatus for variably controlling the speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; rotating speed calculating means, the rotating speed calculating means detecting a frequency of either one or both of the α- and β-axis calculation values calculated in the voltage generator, and calculating rotating speed data of the induction motor based on the detected frequency; and rotating direction detecting means. The rotating direction detecting means detects the rotating direction of the induction motor based on the phase relation between the α- and β-axis calculation values to start the PWM inverter or to restart the PWM inverter after the AC power supply has recovered from a momentary service interruption based on the calculated rotating speed data and the detected rotating direction.

According to a fourteenth embodiment of the invention, the control apparatus further includes a high-pass filter inserted in the paths connecting the voltage generator with the rotating speed calculating means and the rotating direction detecting means.

According to a fifteenth embodiment of the invention, there is provided a control apparatus for variably controlling the speed of an induction motor, which includes a PWM inverter for converting a fed AC power supply to an alternating current having a desired frequency and a desired voltage and for feeding the converted alternating current to the induction motor. The control apparatus comprises a voltage generator for self-excited oscillation, the voltage generator outputting reference voltages on an α-axis and a β-axis, perpendicular to each other on a stationary coordinate; the PWM inverter for feeding a voltage for self-excited oscillation of the primary current of the induction motor to the induction motor based on the α- and β-axis reference voltages; rotating speed calculating means, the rotating speed calculating means detecting a frequency of either one or both of the α- and β-axis calculation values calculated in the voltage generator, and calculating the rotating speed data of the induction motor based on the detected frequency; rotating direction detecting means for detecting the rotating direction of the induction motor based on the phase relation between the α- and β-axis calculation values; and starting phase calculating means. The starting phase calculating means calculates the start timing or the starting phase data of the PWM inverter based on either one or both of the α- and β-axis calculation values and the calculated rotating speed data to start the PWM inverter or to restart the PWM inverter after the AC power supply has recovered from a momentary service interruption based on the calculated start timing or the calculated starting phase data, the calculated rotating speed data and the detected rotating direction.

According to a sixteenth embodiment of the invention, the control apparatus further includes a high-pass filter inserted in paths connecting the voltage generator with the rotating speed calculating means, the rotating direction detecting means and starting phase calculating means.

The voltage generator may include a first induction motor model for calculating a first voltage from the α-axis reference voltage; a first adder for calculating a first voltage difference between the first voltage and a voltage obtained by multiplying the α-axis component of the primary current of the induction motor and a first feedback gain; a first limiter for limiting the first voltage difference and for outputting the limited first voltage difference as the α-axis reference voltage; a second induction motor model for calculating a second voltage from the β-axis reference voltage; a second adder for calculating a second voltage difference between the second voltage and a voltage obtained by multiplying the β-axis component of the primary current of the induction motor and a second feedback gain; a second limiter for limiting the second voltage difference and for outputting the limited second voltage difference as the β-axis reference voltage; and an initial voltage generator, the output thereof being connected to the first adder or the second adder.

The voltage generator may include a first induction motor model for calculating a first voltage from the α-axis reference voltage and the α-axis component of the primary current of the induction motor; a first limiter for limiting the first voltage; a first adder for calculating a first voltage difference between the limited first voltage and a voltage obtained by multiplying the α-axis component of the primary current of the induction motor and a first feedback gain, and for outputting the calculated first voltage difference as the α-axis reference voltage; a second induction motor model for calculating a second voltage from the β-axis reference voltage and the β-axis component of the primary current of the induction motor; a second limiter for limiting the second voltage; a second adder for calculating a second voltage difference between the limited second voltage and a voltage obtained by multiplying the β-axis component of the primary current of the induction motor and a second feedback gain, and for outputting the calculated second voltage difference as the β-axis reference voltage; an initial voltage generator; and a third adder inserted between the first induction motor model and the first limiter or between the second induction motor model and the second limiter. The third adder adds the output of the initial voltage generator and the output of the first or second induction motor model.

The voltage generator may include a first adder; a first induction motor model for calculating a first voltage from the output of the first adder; a first limiter for limiting the first voltage outputted from the first induction motor model, the first adder calculating a first voltage difference between the limited first voltage and a voltage obtained by multiplying the α-axis component of the primary current of the induction motor and a first feedback gain; a second adder for adding the fist voltage difference and an α-axis compensation voltage obtained by multiplying the α-axis component of the primary current and the primary resistance of the induction motor and for outputting the result of the adding as the α-axis reference voltage; a third adder; a second induction motor model for calculating a second voltage from the output of the third adder; a second limiter for limiting the second voltage outputted from the second induction motor model, the third adder calculating a second voltage difference between the limited second voltage and a voltage obtained by multiplying the β-axis component of the primary current of the induction motor and a second feedback gain; a fourth adder for adding the second voltage difference and a β-axis compensation voltage obtained by multiplying the β-axis component of the primary current and a primary resistance of the induction motor and for outputting the result of the adding as the β-axis reference voltage; an initial voltage generator; and a fifth adder inserted between the first induction motor model and the first limiter or between the second induction motor model and the second limiter, for adding the output of the initial voltage generator and the output of the first or second adder.

The voltage generator may include a first current regulator; a first induction motor model for calculating a first voltage from the output of the first current regulator; a first limiter for limiting the first voltage outputted from the first induction motor model; a first adder for calculating a first voltage difference between the limited first voltage and the α-axis component of the primary current of the induction motor; a second adder for adding the first voltage difference and an α-axis compensation voltage obtained by multiplying the α-axis component of the primary current and the primary resistance of the induction motor and for outputting the result of the adding as the α-axis reference voltage; a second current regulator; a second induction motor model for calculating a second voltage from the output of the second current regulator; a second limiter for limiting the second voltage outputted from the second induction motor model; a third adder for calculating a second voltage difference between the limited second voltage and a voltage obtained by multiplying the β-axis component of the primary current of the induction motor and a second feedback gain; a fourth adder for adding the second voltage difference and a β-axis compensation voltage obtained by multiplying the β-axis component of the primary current and a primary resistance of the induction motor and for outputting the result of the adding as the β-axis reference voltage; and an initial voltage generator connected to the first adder or the third adder.

Preferably, the voltage outputted from the initial voltage generator has a step-shaped wave form or an impulse-shaped wave form.

The present invention is based on the following mechanisms. Namely, it is well known that the impedance of the induction motor rotating at an angular frequency $\omega_2$ is largest when the angular frequency of the voltage that the PWM inverter feeds to the induction motor is $\omega_2$.

Therefore, by appropriately configuring the circuit of the voltage generator, by appropriately setting the circuit constants of the voltage generator and by forming a self-excited oscillation circuit by a loop including the voltage generator, the PWM inverter and the induction motor, the self-excited oscillation circuit keeps oscillating at the foregoing angular frequency $\omega_2$ (=$2\pi f$) as described in FIGS. 9(a) and 9(b). By measuring the frequency of the α-axis component of the primary current (FIG. 9(a)) or the β-axis component of the primary current (FIG. 9(b)) of the induction motor with the rotating speed calculating means, the rotating speed data of the induction motor is obtained. Since the amplitudes of the α- and β-axis components of the primary current do not decade as described in FIGS. 9(a) and 9(b), the rotating speed data of the induction motor is calculated without problem even when the induction motor is rotating at a low speed. Moreover, by detecting the phase relation between the α-axis component of the primary current (FIG. 9(a)) and the β-axis component of the primary current (FIG. 9(b)) of the induction motor, the rotating direction of the induction motor is detected.

DETAILED DESCRIPTION OF PREFERRED EMBODIMENTS

Figure 18:
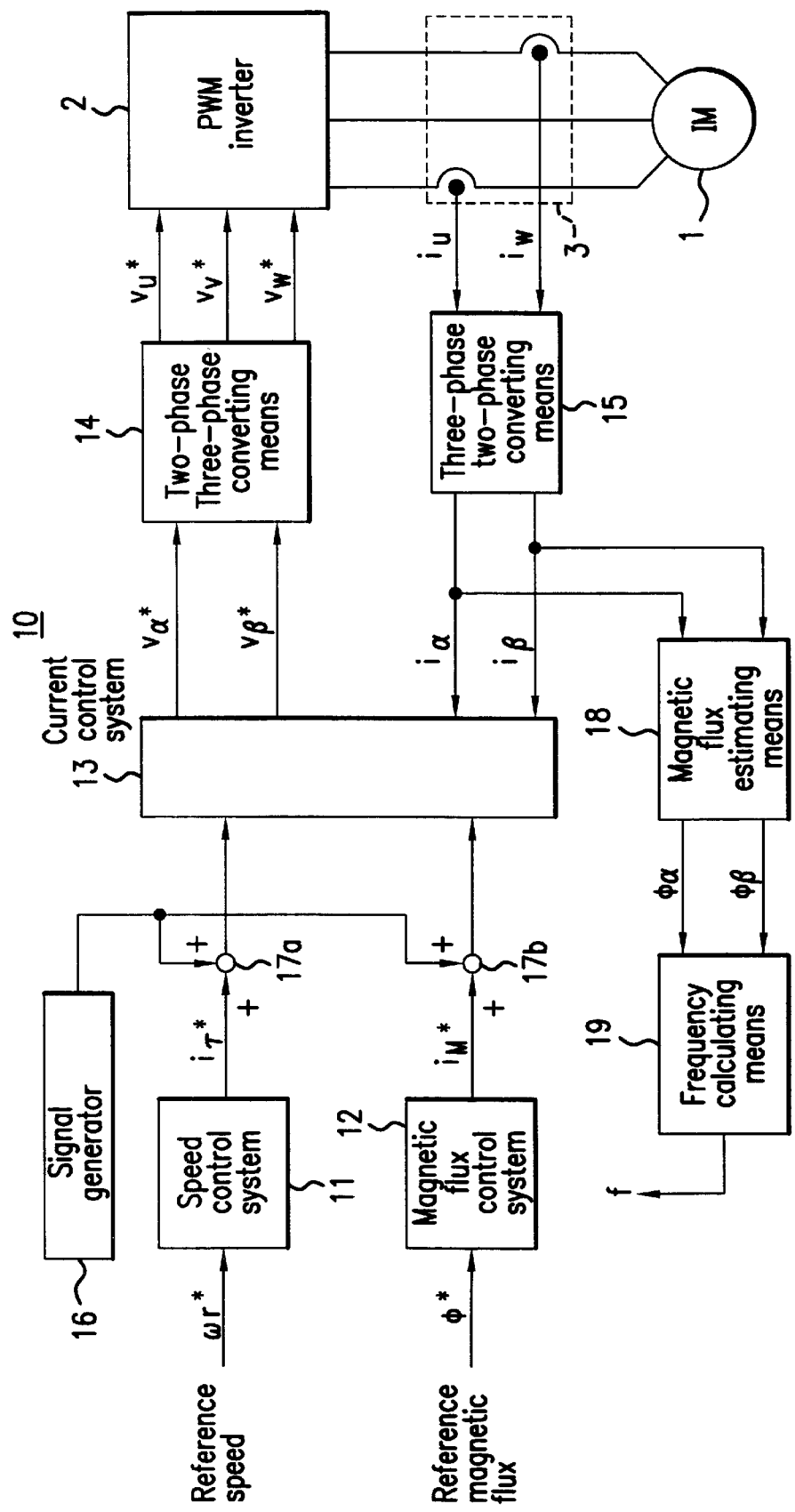
FIG. 18 is a block diagram of a conventional control apparatus for variably controlling a speed of an induction motor.
Figure 19:
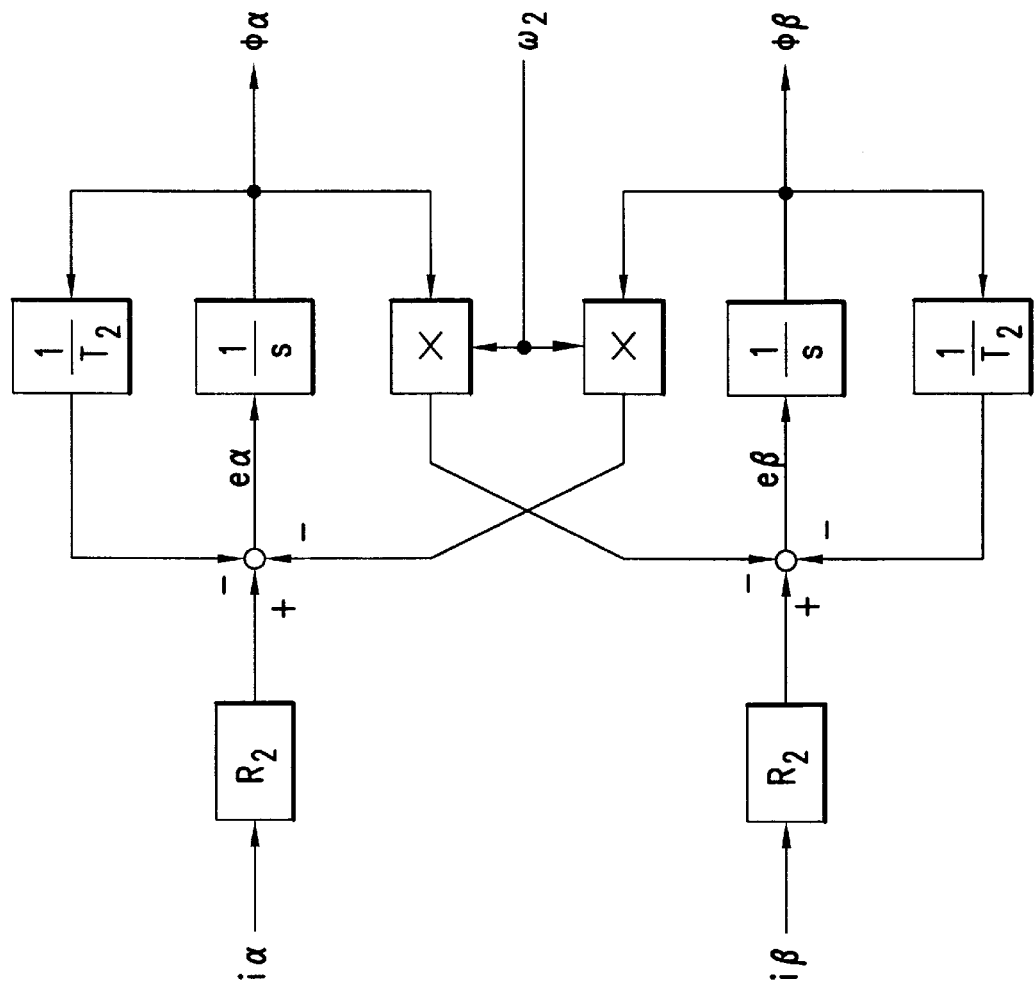
FIG. 19 is a functional block diagram for explaining operations of the conventional speed-control apparatus of FIG. 18.

Now, the invention will be explained hereinafter with reference to the accompanied drawings illustrating preferred embodiments of the invention. Throughout these figures, parts similar to those of FIG. 18 are designated by the like reference numerals.

Figure 1:
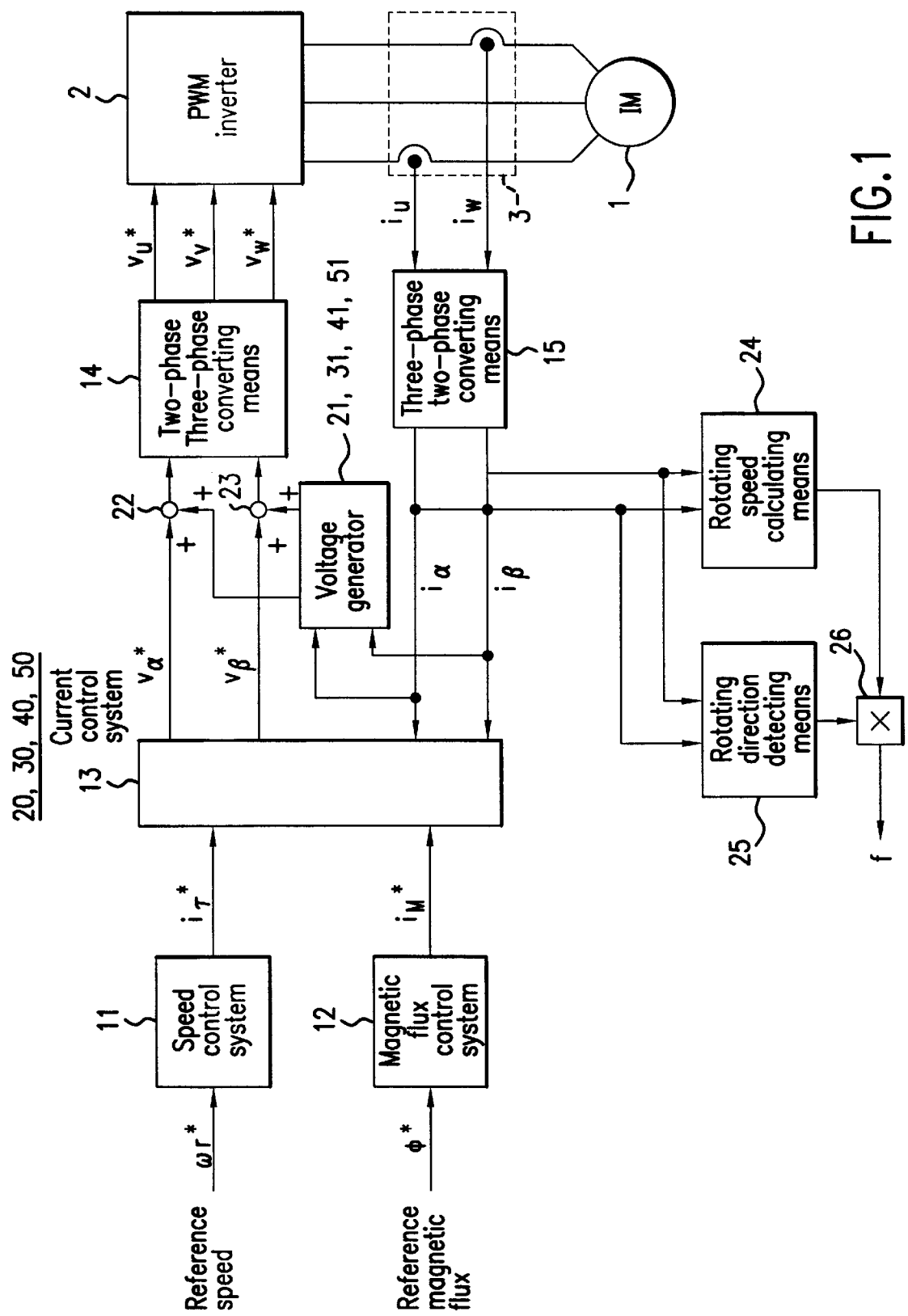
FIG. 1 is a block circuit diagram of a control apparatus for variably controlling a speed of an induction motor according to a first embodiment of the invention.

FIG. 1 is a block circuit diagram of a control apparatus for variably controlling a speed of an induction motor according to a first embodiment of the invention.

Referring now to FIG. 1, either one of the speed-control apparatuses 20, 30, 40 and 50 includes a speed control system 11, a magnetic flux control system 12, a current control system 13, two-phase three-phase converting means 14, and three-phase two-phase converting means 15. The speed-control apparatus 20, 30, 40 or 50 further includes a voltage generator 21, 31, 41 or 51 that works for a predetermined period of time to start a PWM inverter 2 or to restart the PWM inverter 2 after an AC power supply (not shown) that feeds electric power to the PWM inverter 2 has recovered from a momentary service interruption, adders 22 and 23, rotating speed calculating means 24, rotating direction detecting means 25, and a multiplier 26.

Figure 9A:
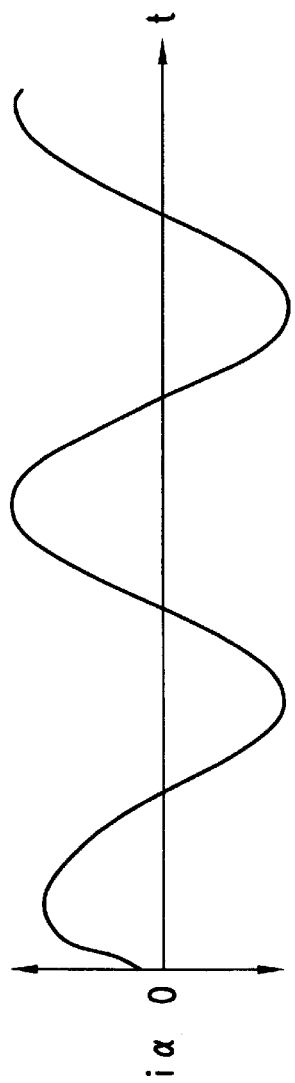
FIGS. 9(a) and 9(b) show wave forms for explaining function of the control apparatus according to the invention.
Figure 9B:
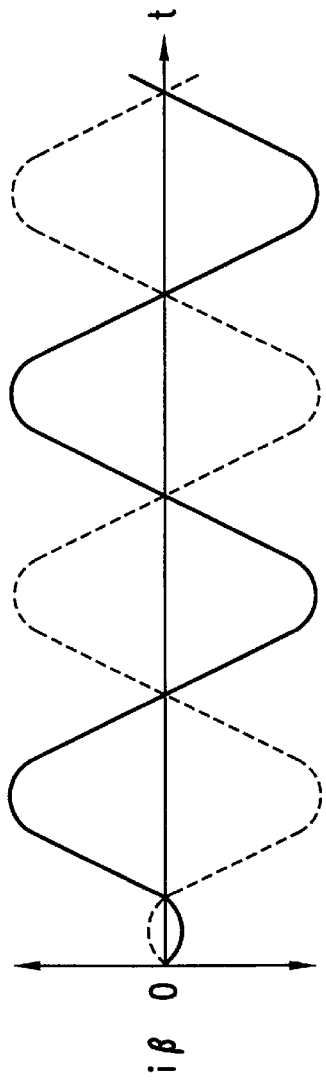

In the speed-control apparatus 20, 30, 40 or 50, a loop connecting the voltage generator 21, 31, 41 or 51, the two-phase three-phase converting means 14, the PWM inverter 2, the induction motor 1, the current detector 3 and the three-phase two-phase converting means 15 constitutes a self-excited oscillation circuit. In this self-excited oscillation circuit, oscillation as described in FIGS. 9(a) and 9(b) at the angular frequency $\omega_2 = 2\pi f$ continues. The rotating speed data (f) is obtained by measuring the frequency of the $\alpha$-axis component or the $\beta$-axis component of the primary current (FIGS. 9(a) or 9(b)) of the induction motor 1 with the rotating speed calculating means 24. The $\alpha$-axis component or the $\beta$-axis component of the primary current of the induction motor 1 is outputted from the three-phase two-phase converting means 15. Since the amplitudes of the $\alpha$- and $\beta$-axis components of the primary current do not decade as shown in FIGS. 9(a) and 9(b), the rotating speed data (f) is calculated without problem even when the induction motor 1 is rotating at a low speed.

The phase relation of the $\alpha$- and $\beta$-axis components when the self-excited oscillation circuit is oscillating is detected by the rotating direction detecting means 25. When the wave form of the $\beta$-axis component is represented by the solid curve as shown in FIG. 9(b), the rotating direction of the induction motor 1 is judged to be forward. When the wave form is represented by the broken curve as shown in FIG. 9(b), the rotating direction of the induction motor 1 is judged to be reverse. By multiplying the polarity of the rotating direction and the rotating speed data obtained by the rotating speed calculating means 24 in the multiplier 26, the rotating speed data (f) is provided with a positive or negative sign.

In FIG. 1 and the following embodiment, the current control system 13 does not output the reference voltages $v\alpha^*$ and $v\beta^*$ while the voltage generator 21, 31, 41 or 51 is outputting the reference voltages $v_1\alpha^*$ and $v_1B^*$ for starting or restarting the PWM inverter 2. After the PWM inverter 2 is started or restarted, the current control system 13 outputs the reference voltages $v\alpha^*$ and $v\beta^*$ and the reference voltages from the voltage generator 21, 31, 41 or 51 are set to zero.

Figure 2:
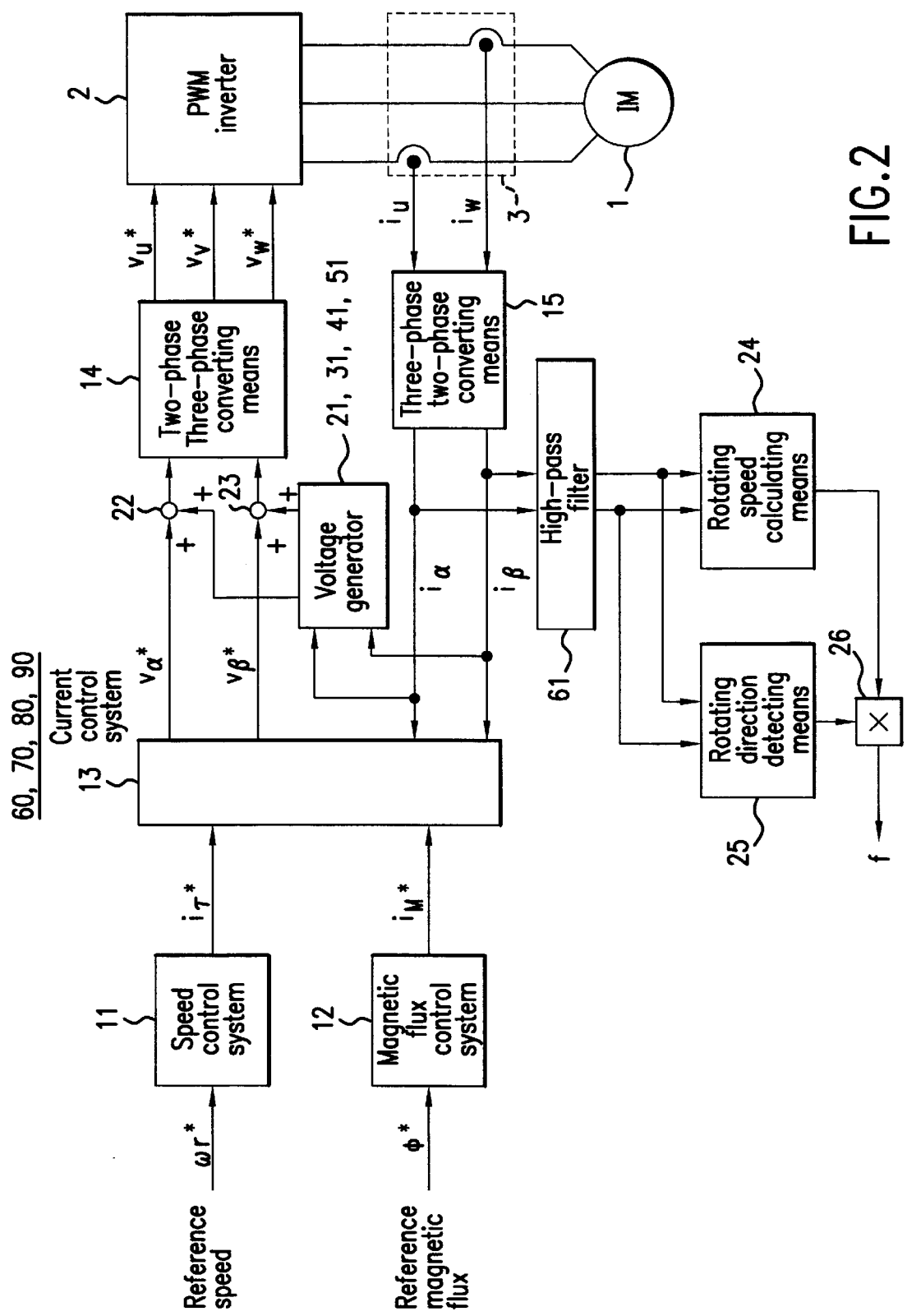
FIG. 2 is a block circuit diagram of a control apparatus for variably controlling a speed of an induction motor according to a second embodiment of the invention.

FIG. 2 is a block circuit diagram of a control apparatus for variably controlling the speed of an induction motor according to a second embodiment of the invention.

Referring now to FIG. 2, either one of the speed-control apparatuses 60, 70, 80 and 90 includes a speed control system 11, a magnetic flux control system 12, a current control system 13, two-phase three-phase converting means 14, and three-phase two-phase converting means 15. The speed-control apparatus 60, 70, 80 or 90 further includes a voltage generator 21, 31, 41 or 51 that works for a predetermined period of time to start a PWM inverter 2 or to restart the PWM inverter 2 after an AC power supply (not shown) that feeds electric power to the PWM inverter 2 has recovered from a momentary service interruption, adders 22 and 23, rotating speed calculating means 24, rotating direction detecting means 25, a multiplier 26 and a high-pass filter 61.

In FIG. 2, a high-pass filter 61 interposed between the three-phase two-phase converting means 15 and the rotating speed calculating means 24 (and the rotating direction detecting means 25) removes offset components from the $\alpha$- and $\beta$-axis components of the primary current (i$\alpha$, i$\beta$) of the induction motor 1. The provision of the high-pass filter 61 improves the reliability of the operation of the rotating speed calculating means 24 and the rotating direction detecting means 25.

Now the voltage generators 21, 31, 41 and 51 in FIGS. 1 and 2 will be explained.

Figure 3:
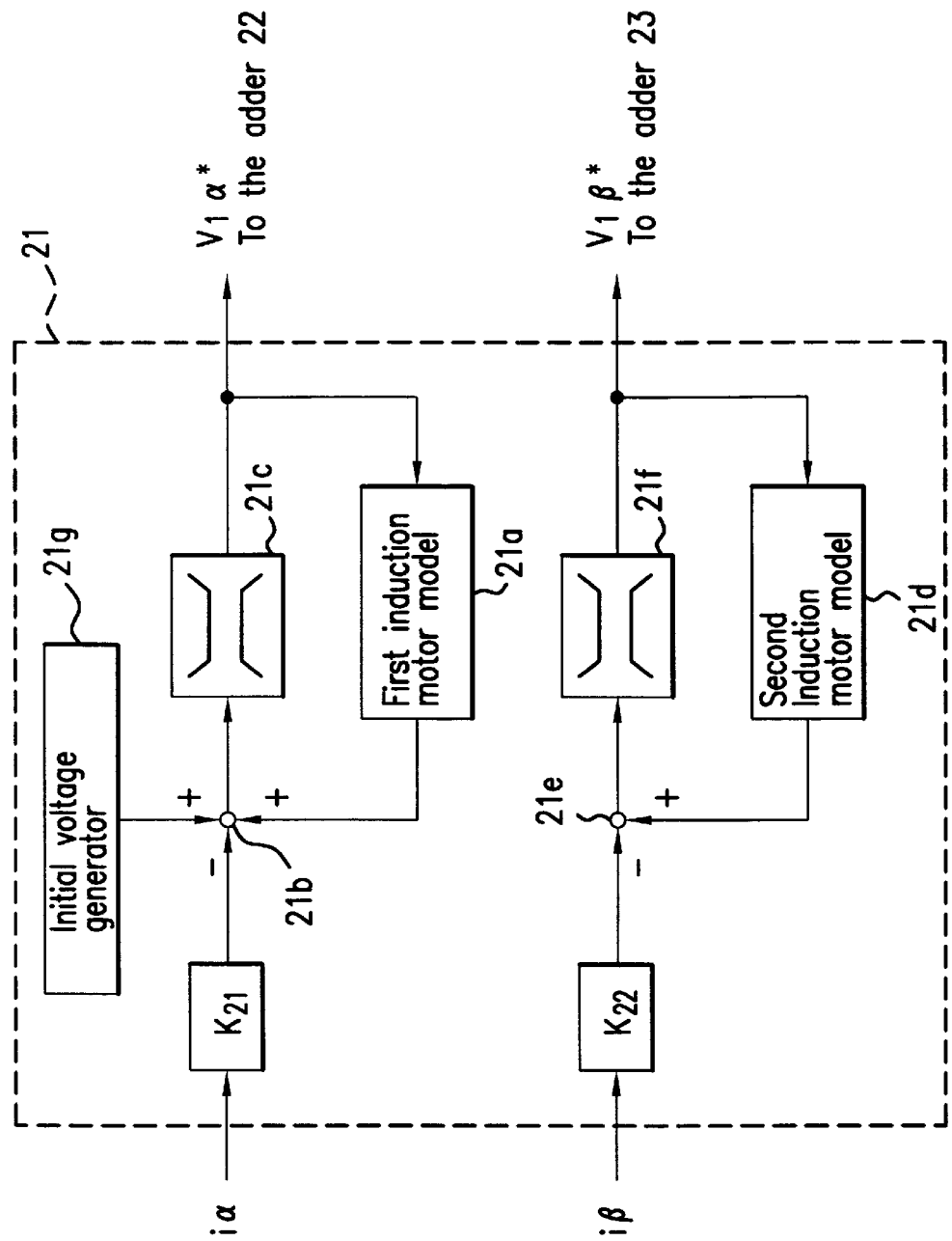
FIG. 3 is a block circuit diagram of an embodiment of a voltage generator according to the invention.

FIG. 3 is a block circuit diagram of the voltage generator 21. Referring now to FIG. 3, the voltage generator 21 includes a first induction motor model 21a, a first adder 21b, and a first limiter 21c. The first induction motor model 21a calculates a first voltage value from the α-axis reference voltage $v_1\alpha^*$, that is the output of the voltage generator 21. The voltage generator 21 obtains a second voltage value by multiplying the α-axis component of the primary current iα of the induction motor 1 and a first feedback gain $K_{21}$. The α-axis component of the primary current iα is outputted from the three-phase two-phase converting means 15. The first adder 21b calculates a voltage difference between the first and second voltage values. The first limiter 21c limits the voltage difference outputted from the first adder 21b. The voltage generator 21 outputs the limited output of the first limiter 21c as the α-axis reference voltage $v_1\alpha^*$.

The voltage generator 21 also includes a second induction motor model 21d, a second adder 21e, and a second limiter 21f. The second induction motor model 21d calculates a third voltage value from the β-axis reference voltage $v_1\beta^*$, that is another output of the voltage generator 21. The voltage generator 21 obtains a fourth voltage value by multiplying the β-axis component of the primary current iβ of the induction motor 1 and a second feedback gain $K_{22}$. The β-axis component of the primary current iβ is outputted from the three-phase two-phase converting means 15. The second adder 21e calculates a voltage difference between the third and fourth voltage values. The second limiter 21f limits the voltage difference outputted from the second adder 21e. The voltage generator 21 outputs the limited output of the second limiter 21f as the β-axis reference voltage $v_1\beta^*$. An initial voltage generator 21g is connected to the first adder 21b.

The first and second induction models 21a and 21d of FIG. 3 calculate the following equation (4).

$$Vo = G_F V_I + (K_F/s\, L_M) V_I \quad (4)$$

Here, Vo is the output from the induction motor model, $V_I$ an input to the induction motor model, $G_F$ a transfer function of a low-pass filter, $K_F$ an integration gain, $L_M$ an exciting inductance of the induction motor 1, and s a differential operator for Laplace transformation.

Self-excited oscillation of the loop, consisting of the voltage generator 21, the two-phase three-phase converting means 14, the PWM inverter 2, the induction motor 1, the current detector 3 and the three-phase two-phase converting means 15, is triggered by outputting a voltage with a step-shaped wave form or an impulse-shaped wave form from the initial voltage generator 21g of FIG. 3. The self-excited oscillation is continued by adjusting the limit values of the limiters 21c, 21f and the feedback gains $K_{21}$, $K_{22}$.

In the voltage generator 21, the output from the initial voltage generator 21g may be connected to the second adder 21e in place of the first adder 21b. The limiters 21c and 21f may be omitted.

Figure 4:
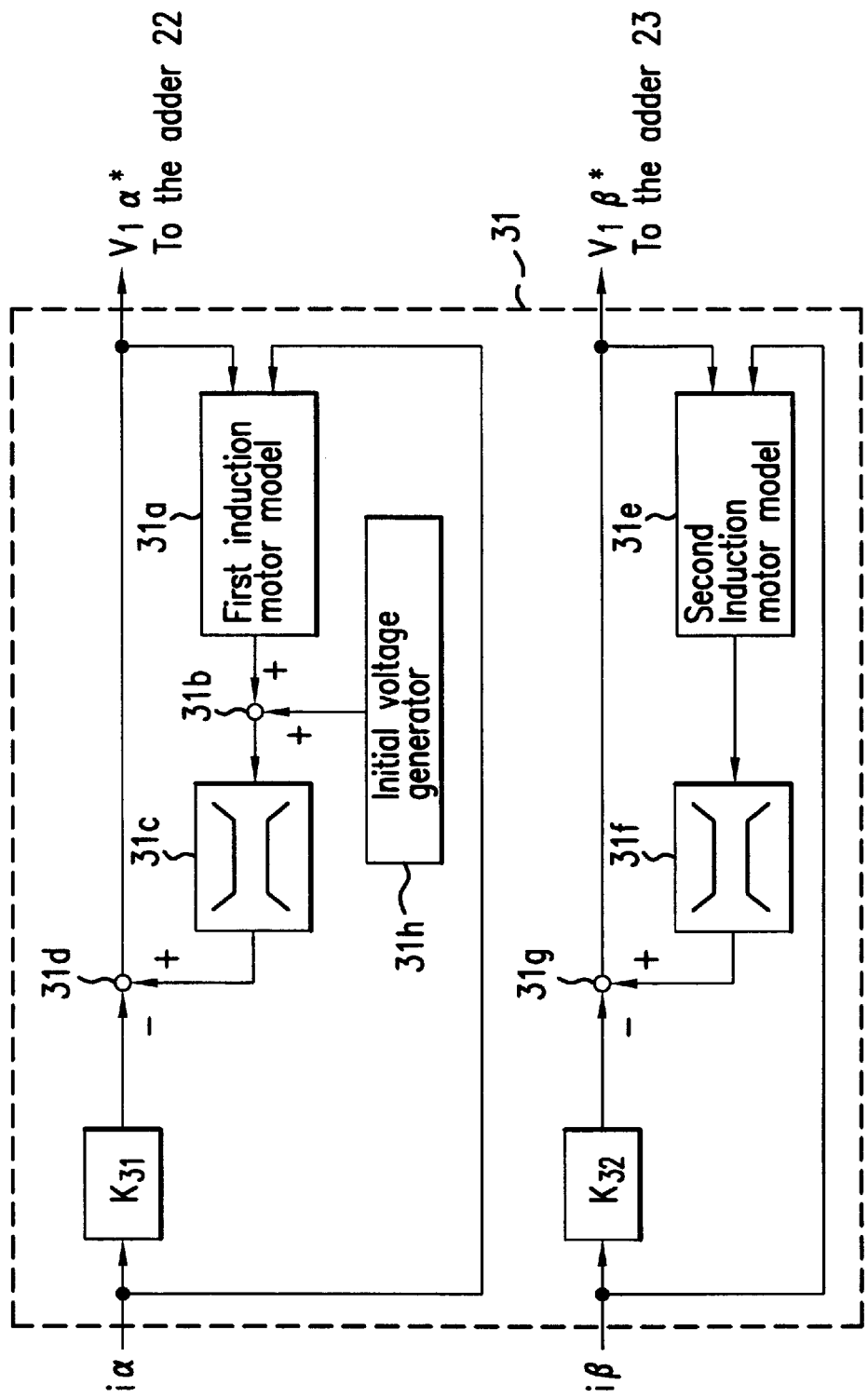
FIG. 4 is a block circuit diagram of another embodiment of a voltage generator according to the invention.

FIG. 4 is a block circuit diagram of the voltage generator 31. Referring now to FIG. 4, the voltage generator 31 includes a first induction motor model 31a, a third adder 31b, a first limiter 31c and a first adder 31d. The α-axis reference voltage $v_1\alpha^*$, that is an output of the voltage generator 31, and the α-axis component of the primary current iα of the induction motor 1 are inputted to the first induction motor model 31a. The output of the first induction motor model 31a is connected to the first limiter 31c via the third adder 31b. The first limiter 31c limits the input from the third adder 31b and outputs a limited value as a first voltage value. The voltage generator 31 obtains a second voltage value by multiplying the α-axis component of the primary current iα of the induction motor 1 and a first feedback gain $K_{31}$. The α-axis component of the primary current iα is outputted from the three-phase two-phase converting means 15. The first adder 31d calculates a voltage difference between the first and second voltage values. The voltage generator 31 outputs the voltage difference obtained by the first adder 31d as the α-axis reference voltage $v_1\alpha^*$.

The voltage generator 31 also includes a second induction motor model 31e, a second limiter 31f, and a second adder 31g. The β-axis reference voltage $v_1\beta^*$, that is another output of the voltage generator 31, and the β-axis component of the primary current iβ of the induction motor 1 are inputted to the second induction motor model 31e. The output of the second induction motor model 31e is connected to the second limiter 31f. The second limiter 31f limits the input from the second induction motor model 31e and outputs a limited value as a third voltage value. The voltage generator 31 obtains a fourth voltage value by multiplying the β-axis component of the primary current iβ of the induction motor 1 and a second feedback gain $K_{32}$. The β-axis component of the primary current iβ is outputted from the three-phase two-phase converting means 15. The second adder 31g calculates the voltage difference between the third and fourth voltage values. The voltage generator 31 outputs the voltage difference obtained by the second adder 31g as the β-axis reference voltage $v_1\beta^*$. An initial voltage generator 31h is connected to the third adder 31b.

The first and second induction models 31a and 31e of FIG. 4 calculate the following equation (5).

$$Vo = G_F V_I + (K_F/s L_M) V_I - R_I I_I \quad (5)$$

Here, Vo is the output from the induction motor model, $V_I$ and $I_I$ inputs to the induction motor model, $G_F$ a transfer function of a low-pass filter, $K_F$ an integration gain, $L_M$ an exciting inductance of the induction motor 1, $R_I$ a primary resistance of the induction motor 1 and s a differential operator for Laplace transformation.

Self-excited oscillation of the loop, consisting of the voltage generator 31, the two-phase three-phase converting means 14, the PWM inverter 2, the induction motor 1, the current detector 3 and the three-phase two-phase converting means 15, is triggered by outputting a voltage with a step-shaped wave form or an impulse-shaped wave form from the initial voltage generator 31h of FIG. 4.

The self-excited oscillation is continued by adjusting the limit values of the limiters 31c, 31f and the feedback gains $K_{31}$, $K_{32}$.

In the voltage generator 31, the output from the initial voltage generator 31h may be connected to the side of the β-axis reference voltage in place of the side of the α-axis reference voltage. The limiters 31c and 31f may be omitted.

Figure 5:
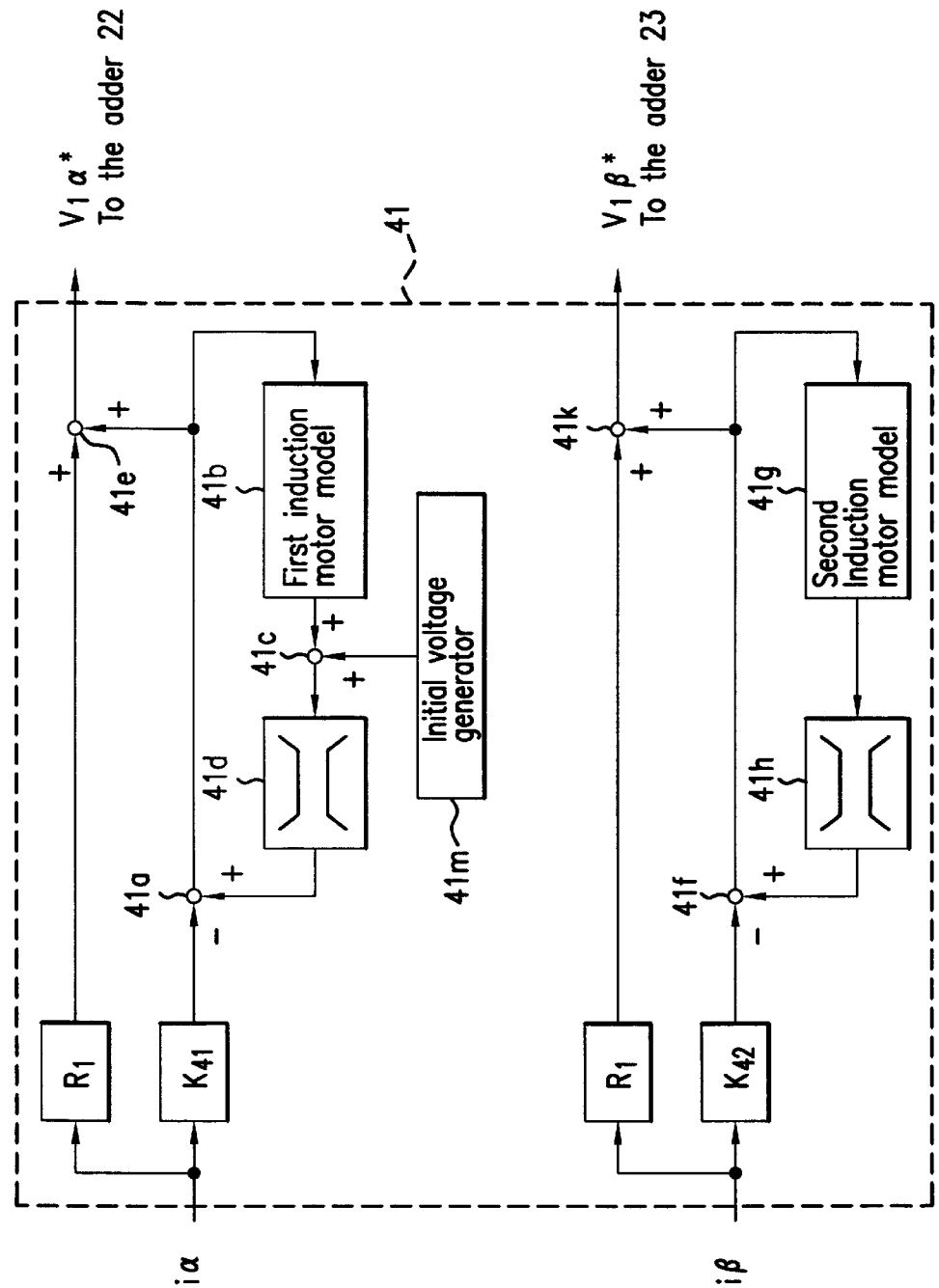
FIG. 5 is a block circuit diagram of a further embodiment of a voltage generator according to the invention.

FIG. 5 is a block circuit diagram of the voltage generator 41. Referring now to FIG. 5, the voltage generator 41 includes a first adder 41a, a first induction motor model 41b, a fifth adder 41c, a first limiter 41d, and a second adder 41e. The output of the first adder 41a is inputted to the first induction motor model 41b. The output of the first induction motor model 41b is connected to the first limiter 41d via the fifth adder 41c. The first limiter 41d limits the input from the fifth adder 41c and outputs a limited value as a first voltage value. The voltage generator 41 obtains a second voltage value by multiplying the α-axis component of the primary current iα of the induction motor 1 and a first feedback gain $K_{41}$. The α-axis component of the primary current iα is outputted from the three-phase two-phase converting means 15. The first adder 41a calculates the voltage difference between the first and second voltage values. The second adder 41e calculates the α-axis reference voltage $v_1\alpha^*$ by adding the voltage difference and an α-axis compensation voltage obtained by multiplying the foregoing iα and the primary resistance ($R_1$) of the induction motor.

The voltage generator 41 also includes a second induction motor model 41g, a second limiter 41h, a third adder 41f and fourth adder 41k. The output of the third adder 41f is inputted to the second induction motor model 41g. The output of the second induction motor model 41g is connected to the second limiter 41h The second limiter 41h limits the input from the second induction motor model 41g and outputs a limited value as a third voltage value. The voltage generator 41 obtains a fourth voltage value by multiplying the β-axis component of the primary current iβ of the induction motor 1 and a second feedback gain $K_{42}$. The β-axis component of the primary current iβ is outputted from the three-phase two-phase converting means 15. The third adder 41f calculates the voltage difference between the third and fourth voltage values. The fourth adder 41k calculates the β-axis reference voltage $v_1B^*$ by adding the voltage difference and a β-axis compensation voltage obtained by multiplying the foregoing iβ and the primary resistance ($R_1$) of the induction motor. An initial voltage generator 41m is connected to the fifth adder 41c.

The first and second induction models 41b and 41g of FIG. 5 calculate the following equation (6).

$$Vo=G_F V_I+(K_F/sL_M)V_I \qquad (6)$$

Here, Vo is the output from the induction motor model, $V_I$ an input to the induction motor model, $G_F$ a transfer function of a low-pass filter, $K_F$ an integration gain, $L_M$ an exciting inductance of the induction motor 1 and s a differential operator for Laplace transformation.

Self-excited oscillation of the loop, consisting of the voltage generator 41, the two-phase three-phase converting means 14, the PWM inverter 2, the induction motor 1, the current detector 3 and the three-phase two-phase converting means 15, is triggered by outputting a voltage with a step-shaped wave form or an impulse-shaped wave form from the initial voltage generator 41m of FIG. 5. The self-excited oscillation is continued by adjusting the limit values of the limiters 41d, 41h and the feedback gains $K_{41}$, $K_{42}$.

In the voltage generator 41, the output from the initial voltage generator 41m may be connected to the side of the β-axis reference voltage in place of the side of the α-axis reference voltage. The limiters 41d and 41h may be omitted.

Figure 6:
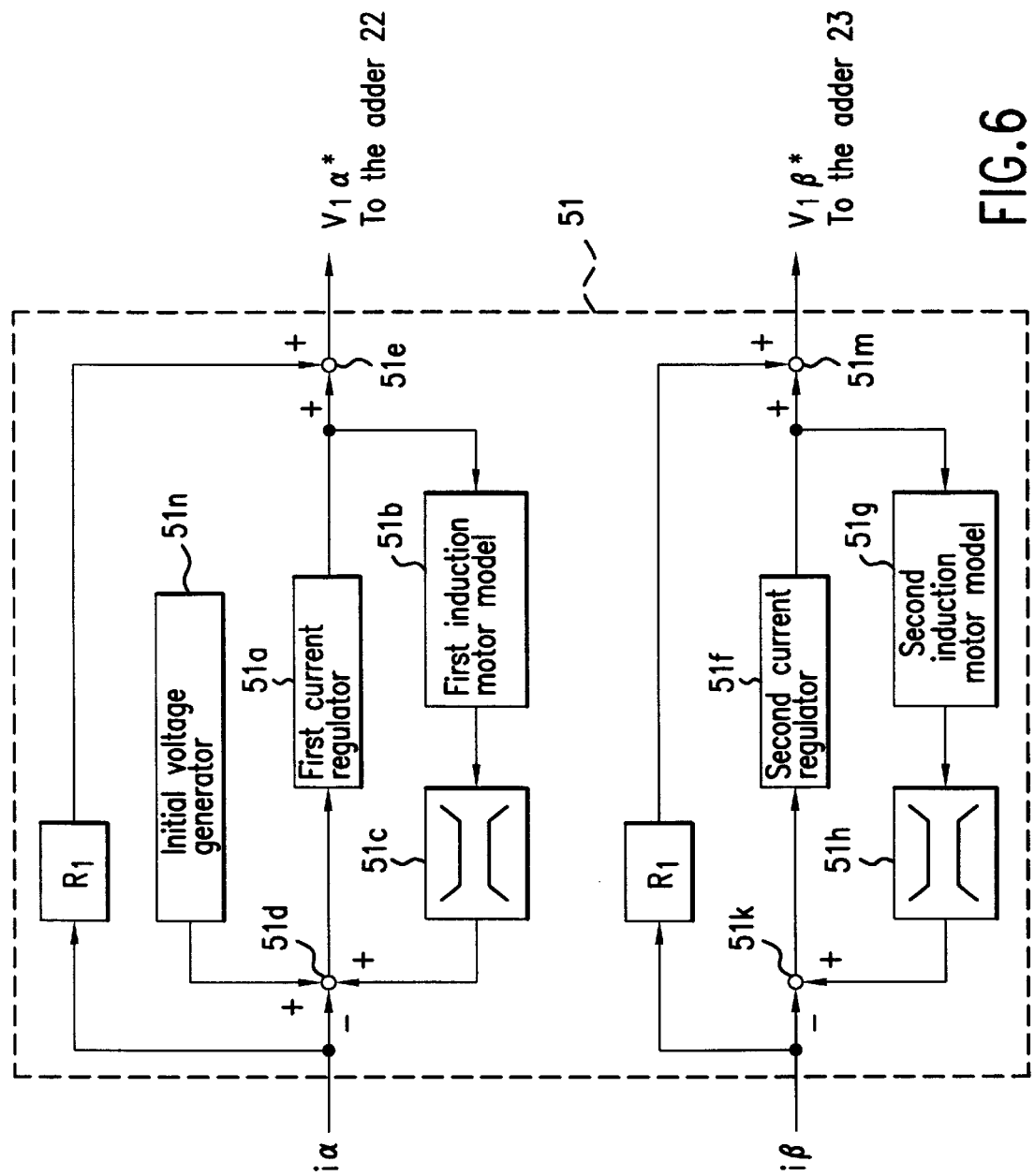
FIG. 6 is a block circuit diagram of a still further embodiment of a voltage generator according to the invention.

FIG. 6 is a block circuit diagram of the voltage generator 51. Referring now to FIG. 6, the voltage generator 51 includes a first current regulator 51a, a first induction motor model 51b, a first limiter 51c, a first adder Sid and a second adder 51e. The output of the first current regulator 51a is connected to the first induction motor model 51b. The first limiter 51c limits the input from the first induction motor model 51b and outputs a limited value to the first adder 51d as a first voltage value. The first adder 51d calculates the voltage difference between the first voltage value and the α-axis component of the primary current iα of the induction motor 1, that is outputted from the three-phase two-phase converting means 15. The first current regulator 51a adjusts the voltage difference. The second adder 51e calculates the α-axis reference voltage $v_1\alpha^*$ by adding the output of the first current regulator 51a and an α-axis compensation voltage obtained by multiplying the foregoing iα and the primary resistance ($R_1$) of the induction motor.

The voltage generator 51 also includes a second current regulator 51f, a second induction motor model 51g, a second limiter 51h, a third adder 51k and a fourth adder 51m. The output of the second current regulator 51f is connected to the second induction motor model 51g. The second limiter 51h limits the input from the second induction motor model 51g and outputs a limited value to the third adder 51k as a second voltage value. The third adder 51k 1a. calculates the voltage difference between the second voltage value and the β-axis component of the primary current iβ of the induction motor 1, that is outputted from the three-phase two-phase converting means 15. The second current regulator 51f adjusts the voltage difference. The fourth adder 51m calculates the β-axis reference voltage $v_1\beta^*$ by adding the output of the second current regulator 51f and a β-axis compensation voltage obtained by multiplying the foregoing iβ and the primary resistance ($R_1$) of the induction motor 1. An initial voltage generator 51n is connected to the first adder 51d.

The first and second induction models 51b and 51g of FIG. 6 calculate the following equation (7).

$$Vo=(K_F/sL_M)V_I \qquad (7)$$

Here, Vo is the output from the induction motor model, $V_I$ an input to the induction motor model, $K_F$ an integration gain, $L_M$ an exciting inductance of the induction motor 1, and s a differential operator for Laplace transformation.

Self-excited oscillation of the loop, consisting of the voltage generator 51, the two-phase three-phase converting means 14, the PWM inverter 2, the induction motor 1, the current detector 3 and the three-phase two-phase converting means 15, is triggered by outputting a voltage with a step-shaped wave form or an impulse-shaped wave form from the initial voltage generator 51n of FIG. 6. The self-excited oscillation is continued by adjusting the limit values of the limiters 51c and 51h.

In the voltage generator 61, the output from the initial voltage generator 51n may be connected to the third adder 51k in place of the first adder 51d. The limiters 51c and 51h may be omitted.

Figure 7:
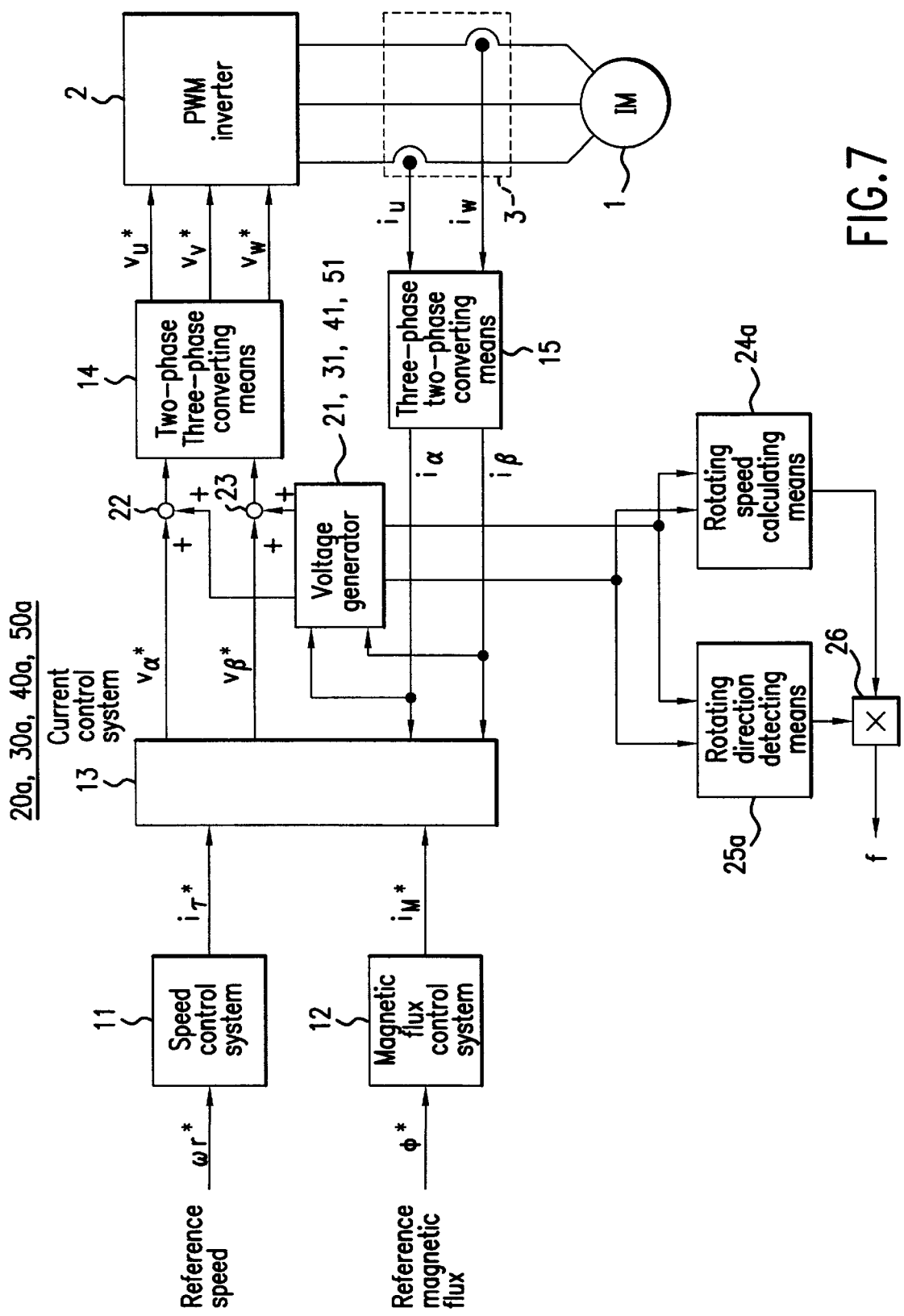
FIG. 7 is a block circuit diagram of a control apparatus for variably controlling a speed of an induction motor according to a third embodiment of the invention.

FIG. 7 is a block circuit diagram of a control apparatus for variably controlling the speed of an induction motor according to a third embodiment of the invention.

Referring now to FIG. 7, either one of the speed-control apparatuses 20a, 30a, 40a and 50a includes a speed control system 11, a magnetic flux control system 12, a current control system 13, two-phase three-phase converting means 14, and three-phase two-phase converting means 15. The speed-control apparatus 20a, 30a, 40a or 50a further includes a voltage generator 21, 31, 41 or 51 that works for a predetermined period of time to start a PWM inverter 2 or to restart the PWM inverter 2 after an AC power supply (not shown) that feeds electric power to the PWM inverter 2 has recovered from a momentary service interruption, adders 22 and 23, rotating speed calculating means 24a that works in the same way as the rotating speed calculating means 24 of FIG. 1, rotating direction detecting means 25a that works in the same way as the rotating direction detecting means 25 of FIG. 1, and a multiplier 26.

In the speed-control apparatus 20a, 30a, 40a or 50a, a loop connecting the voltage generator 21, 31, 41 or 51, the two-phase three-phase converting means 14, the PWM inverter 2, the induction motor 1, the current detector 3 and the three-phase two-phase converting means 15 constitutes a self-excited oscillation circuit.

This self-excited oscillation circuit keeps oscillating as described in FIGS. 9(a) and 9(b) at the angular frequency $\omega_2=2\pi f$. While the self-excited oscillation circuit is oscillating, the results of the integral operations concerning the α- and β-axes on the right side of either one of the formulas (4) through (7) for the voltage generators 21, 31, 41 or 51 become similar wave forms as those shown in FIGS. 9(*a*) and 9(*b*). The rotating speed data (f) is obtained by measuring the frequency of the result of the integral operation with the rotating speed calculating means 24*a*. Since the amplitude of the result of the integral operations does not decade, the rotating speed data (f) is calculated without problem even when the induction motor 1 is rotating at a low speed.

The phase relation of the result of the operation when the self-excited oscillation circuit is oscillating is detected by the rotating direction detecting means 25*a*. By multiplying the polarity detected by the rotating direction detecting means 25*a* and the rotating speed data obtained by the rotating speed calculating means 24*a* in the multiplier 26, the rotating speed data (f) is provided with a positive or negative sign.

Figure 8:
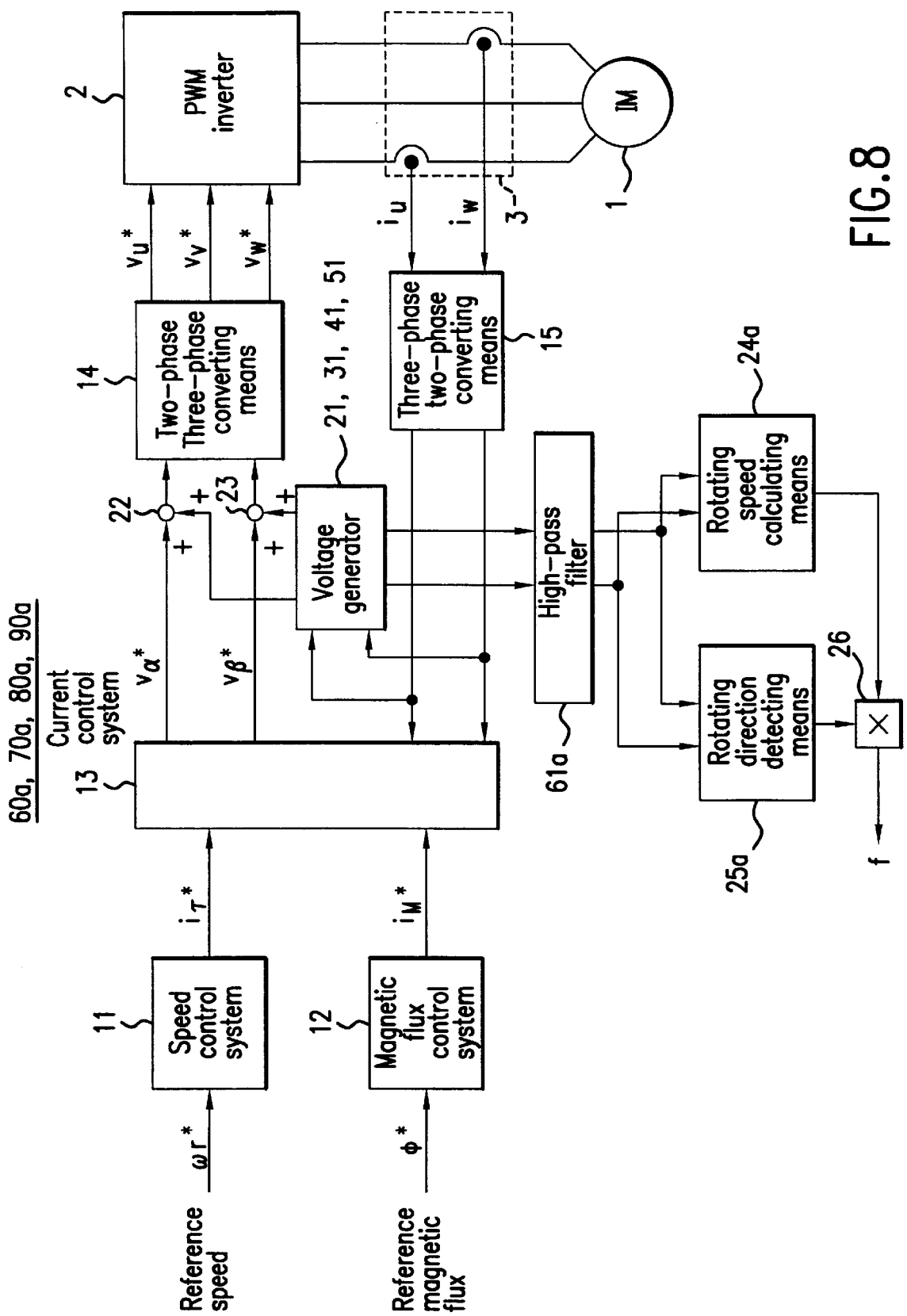
FIG. 8 is a block circuit diagram of a control apparatus for variably controlling a speed of an induction motor according to a fourth embodiment of the invention.

FIG. 8 is a block circuit diagram of a control apparatus for variably controlling a speed of an induction motor according to a fourth embodiment of the invention.

Referring now to FIG. 8, either one of the speed-control apparatuses 60*a*, 70*a*, 80*a* and 90*a* includes a speed control system 11, a magnetic flux control system 12, a current control system 13, two-phase three-phase converting means 14, and three-phase two-phase converting means 15. The speed-control apparatus 60*a*, 70*a*, 80*a* or 90*a* further includes a voltage generator 21, 31, 41 or 51 that works for a predetermined period of time to start a PWM inverter 2 or to restart the PWM inverter 2 after an AC power supply (not shown) that feeds electric power to the PWM inverter 2 has recovered from a momentary service interruption, adders 22 and 23, rotating speed calculating means 24*a*, rotating direction detecting means 25*a*, a multiplier 26, and a high-pass filter 61*a*.

In FIG. 8, the high-pass filter 61*a* interposed in a path from one of the voltage generator 21, 31, 41 or 51 to the rotating speed calculating means 24*a* and the rotating direction detecting means 25*a* removes offset components contained in the α- and β-axis operation terms operated in either one of the foregoing voltage generators. The provision of the high-pass filter 61*a* improves the reliability of the operation of the rotating speed calculating means 24*a* and the rotating direction detecting means 25*a*.

Figure 10:
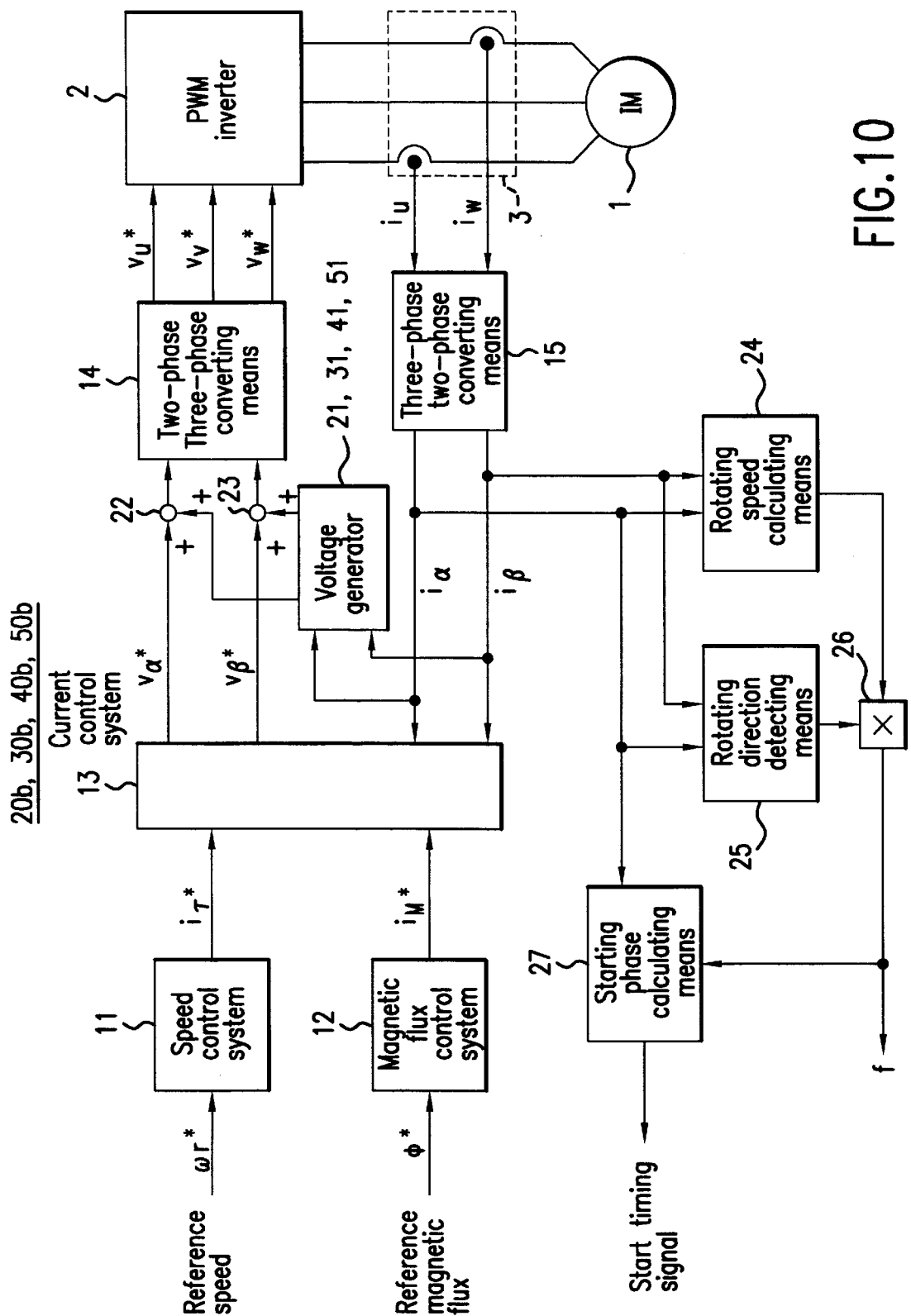
FIG. 10 is a block circuit diagram of a control apparatus for variably controlling a speed of an induction motor according to a fifth embodiment of the invention.

FIG. 10 is a block circuit diagram of a control apparatus for variably controlling a speed of an induction motor according to a fifth embodiment of the invention.

Referring now to FIG. 10, either one of the speed-control apparatuses 20*b*, 30*b*, 40*b* and 50*b* includes a speed control system 11, a magnetic flux control system 12, a current control system 13, two-phase three-phase converting means 14, and three-phase two-phase converting means 15. The speed-control apparatus 20*b*, 30*b*, 40*b* or 50*b* further includes a voltage generator 21, 31, 41 or 51, adders 22 and 23, rotating speed calculating means 24, rotating direction detecting means 25, a multiplier 26, and starting phase calculating means 27.

In FIG. 10, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

Then, the starting phase calculating means 27 calculates a time period from a zero-cross point of the α-axis component of the primary current iα of the induction motor based on the rotating speed data (f). The time period corresponds to the phase difference between the current generated based on the predetermined reference voltages (Vu*, Vv*. Vw*) fed to the PWM inverter 2 immediately after its start and the self-excited oscillating current as shown in FIGS. 9(*a*) and 9(*b*). And, a start timing signal is outputted after the time period has elapsed.

By feeding a start signal to the PWM inverter 2 and by actually starting the PWM inverter 2 when the start timing signal is outputted, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Although the α-axis component of the primary current of the induction motor 1 is inputted to the starting phase calculating means 27 in the circuit configuration shown in FIG. 10, the starting phase (time period) may be calculated by inputting the β-axis component of the primary current of the induction motor 1 to the starting phase calculating means 27.

Figure 11:
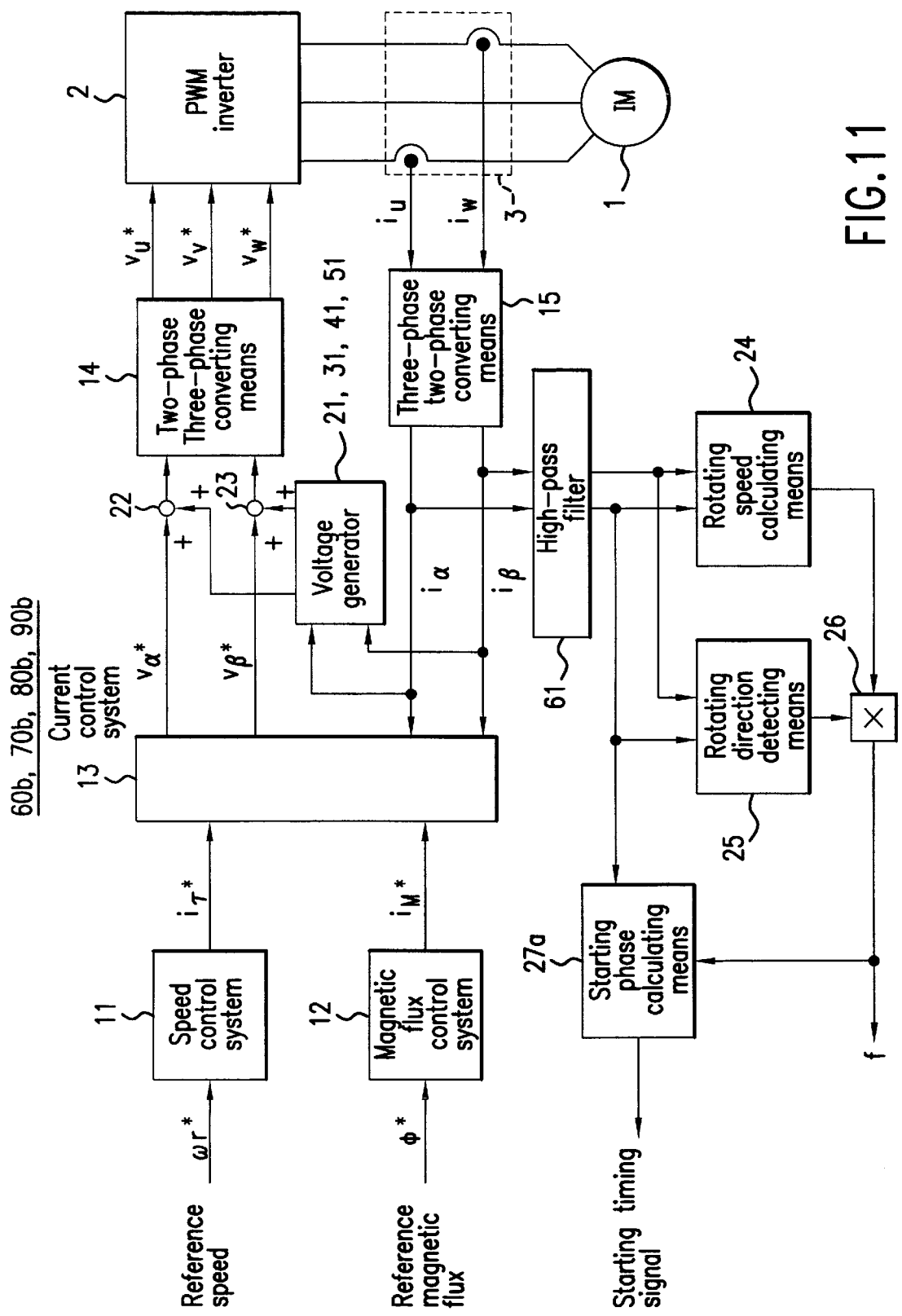
FIG. 11 is a block circuit diagram of a control apparatus for variably controlling a speed of an induction motor according to a sixth embodiment of the invention.

FIG. 11 is a block circuit diagram of a control apparatus for variably controlling the speed of an induction motor according to a sixth embodiment of the invention.

Referring now to FIG. 11, either one of the speed-control apparatuses 60*b*, 70*b*, 80*b* and 90*b* includes a speed control system 11, a magnetic flux control system 12, a current control system 13, two-phase three-phase converting means 14, and three-phase two-phase converting means 15. The speed-control apparatus 60*b*, 70*b*, 80*b* or 90*b* further includes a voltage generator 21, 31, 41 or 51, adders 22 and 23, rotating speed calculating means 24, rotating direction detecting means 25, a multiplier 26, a high-pass filter 61, and starting phase calculating means 27*a*.

In FIG. 11, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

The α-axis component of the primary current iα of the induction motor is fed to the rotating speed calculating means 24, the rotating direction detecting means 25 and the starting phase calculating means 27*a* via the high-pass filter 61. The β-axis component of the primary current iβ of the induction motor is fed to the rotating speed calculating means 24 and the rotating direction detecting means 25 via the high-pass filter 61. The starting phase calculating means 27*a* calculates a time period from a zero-cross point of the α-axis component of the primary current iα based on the rotating speed data (f). The time period corresponds to the phase difference between the current generated based on the predetermined reference voltages (Vu*, Vv*, Vw*) fed to the PWM inverter 2 immediately after its start and the self-excited oscillating current as shown in FIGS. 9(*a*) and 9(*b*). The time period is corrected with respect to the delay time of the high-pass filter 61*a*. And, a start timing signal is outputted after the time period has elapsed.

By feeding a start signal to the PWM inverter 2 and by actually starting the PWM inverter 2 when the start timing signal is outputted, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Although the α-axis component of the primary current of the induction motor 1 is inputted to the starting phase calculating means 27a via the high-pass filter 61 in the circuit configuration shown in FIG. 11, the starting phase (time period) may be calculated by inputting the β-axis component of the primary current of the induction motor 1 to the starting phase calculating means 27a via the high-pass filter 61.

Figure 12:
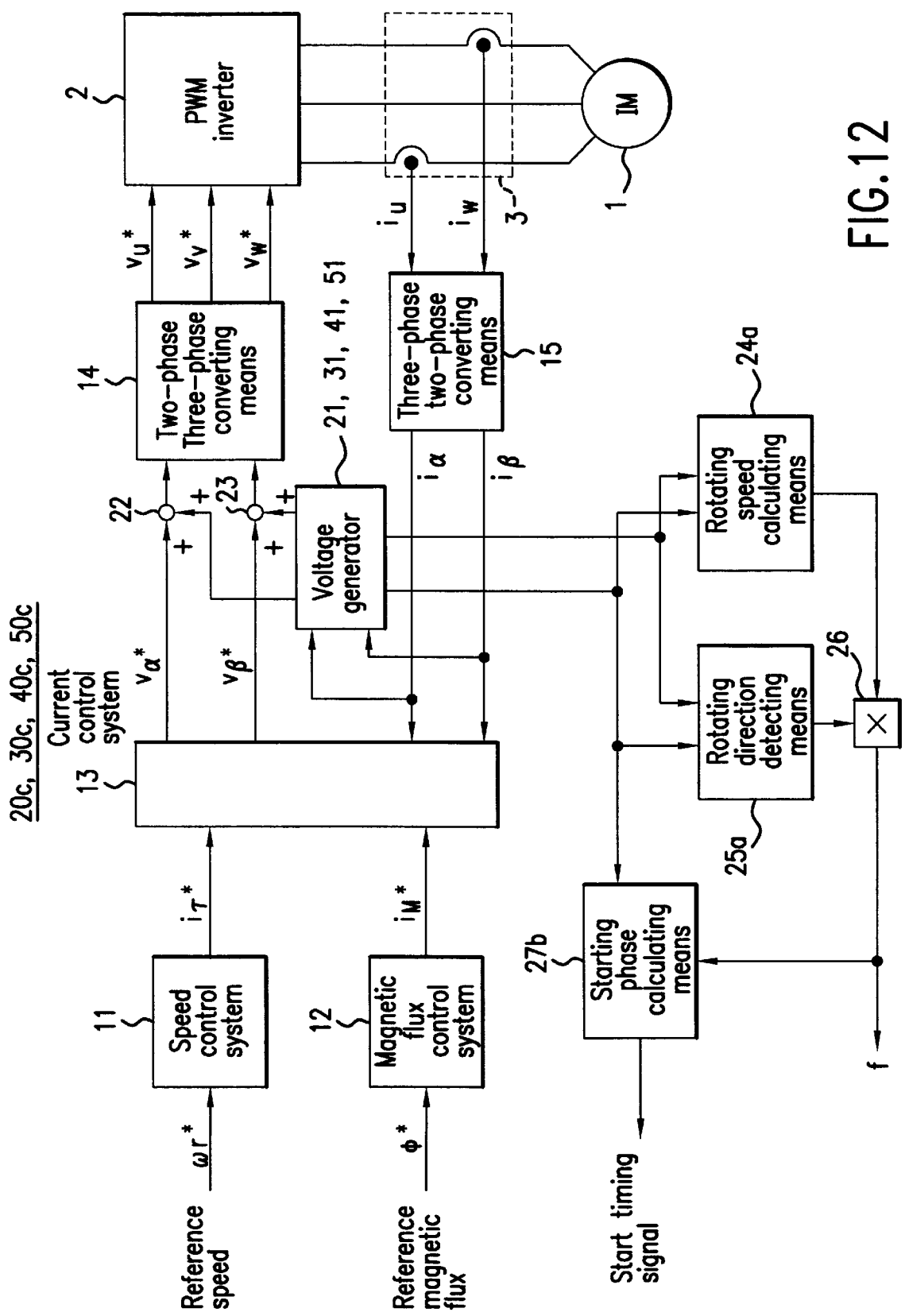
FIG. 12 is a block circuit diagram of a control apparatus for variably controlling a speed of an induction motor according to a seventh embodiment of the invention.

FIG. 12 is a block circuit diagram of a control apparatus for variably controlling the speed of an induction motor according to a seventh embodiment of the invention.

Referring now to FIG. 12, either one of the speed-control apparatuses 20c, 30c, 40c and 50c includes a speed control system 11, a magnetic flux control system 12, a current control system 13, two-phase three-phase converting means 14, three-phase two-phase converting means 15, a voltage generator 21, 31, 41 or 51, adders 22 and 23, rotating speed calculating means 24a, rotating direction detecting means 25a, a multiplier 26, and starting phase calculating means 27b.

In FIG. 12, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

Then, the starting phase calculating means 27b calculates a time period from a zero-cross point of the wave form, obtained in the voltage generator by calculating the integral term on the right side of the respective equations (4) through (7) based on the rotating speed data (f). The time period corresponds to the phase difference between the current generated based on the predetermined reference voltages (Vu*, Vv*. Vw*) fed to the PWM inverter 2 immediately after its start and the wave form obtained by calculating the integral term on the right side of either one of the equations (4) through (7). And, a start timing signal is outputted after the time period has elapsed.

By feeding a start signal to the PWM inverter 2 and by actually starting the PWM inverter 2 when the start timing signal is outputted, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Although the wave form of the α-axis integral term is inputted to the starting phase calculating means 27b in the circuit configuration shown in FIG. 12, the starting phase may be calculated by inputting the wave form of the β-axis integral term to the starting phase calculating means 27b.

Figure 13:
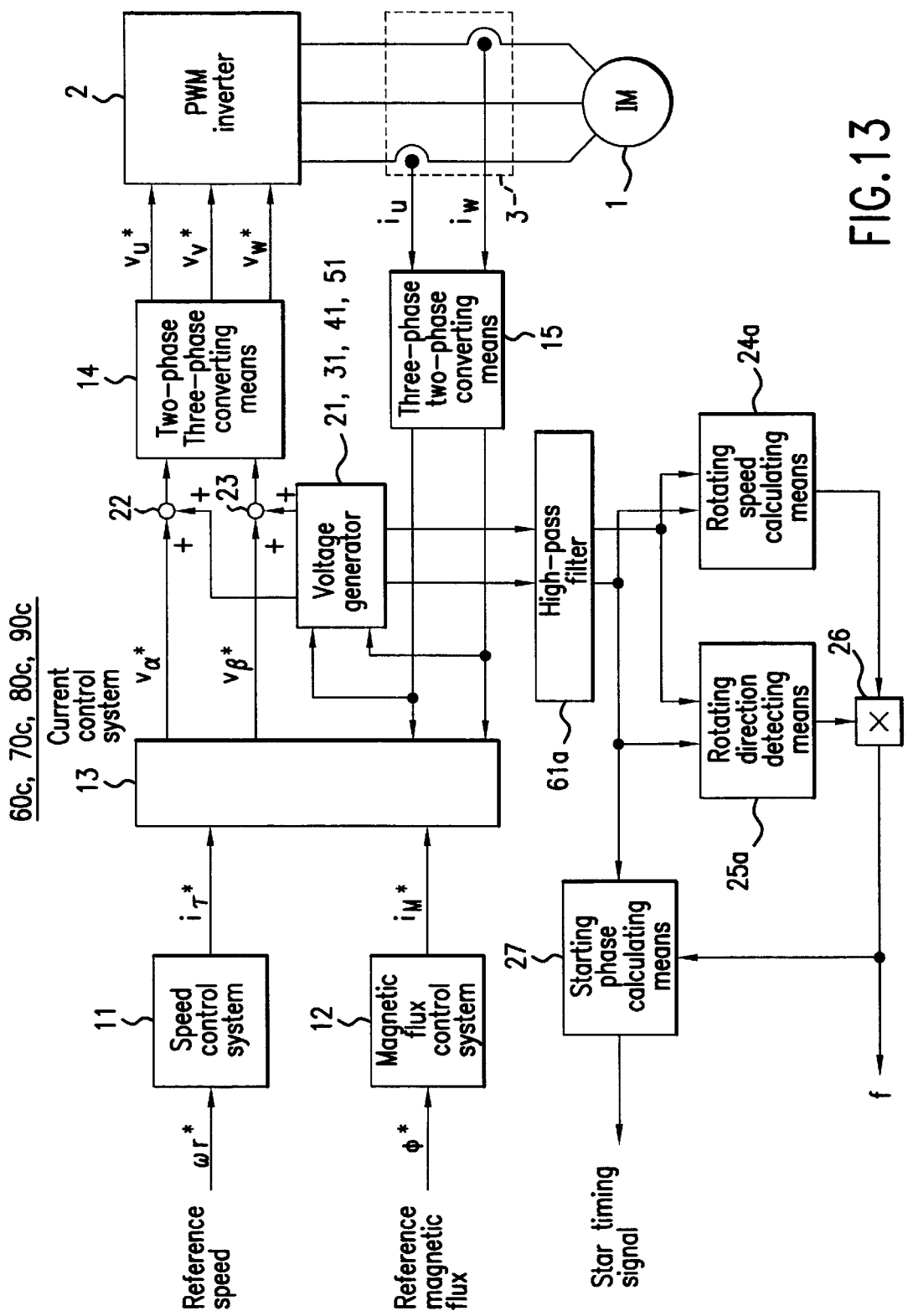
FIG. 13 is a block circuit diagram of a control apparatus for variably controlling a speed of an induction motor according to an eighth embodiment of the invention.

FIG. 13 is a block circuit diagram of a control apparatus for variably controlling a speed of an induction motor according to an eighth embodiment of the invention.

Referring now to FIG. 13, either one of the speed-control apparatuses 60c, 70c, 80c and 90c includes a speed control system 11, a magnetic flux control system 12, a current control system 13, two-phase three-phase converting means 14, three-phase two-phase converting means 15, a voltage generator 21, 31, 41 or 51, adders 22 and 23, rotating speed calculating means 24a, rotating direction detecting means 25a, a multiplier 26, a high-pass filter 61a, and starting phase calculating means 27c.

In FIG. 13, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

The wave form obtained by calculating the integral term on the right side of the equations (4) through (7) in the respective voltage generators is fed to the rotating speed calculating means 24a, the rotating direction detecting means 25a and the starting phase calculating means 27c via the high-pass filter 61a. The starting phase calculating means 27c calculates a time period from a zero-cross point of the wave form. The time period corresponds to the phase difference between the current generated based on the predetermined reference voltages (Vu*, Vv*. Vw*) fed to the PWM inverter 2 immediately after its start and the wave form via the high-pass filter 61a. The time period is corrected with respect to the delay time of the high-pass filter 61a. And, a start timing signal is outputted after the time period has elapsed.

By feeding a start signal to the PWM inverter 2 and by actually starting the PWM inverter 2 when the start timing signal is outputted, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Although the wave form of the α-axis integral term is inputted to the starting phase calculating means 27c via the high-pass filter 61a in the circuit configuration shown in FIG. 13, the starting phase may be calculated by inputting the wave form of the β-axis integral term to the starting phase calculating means 27c via the high-pass filter 61a.

Figure 14:
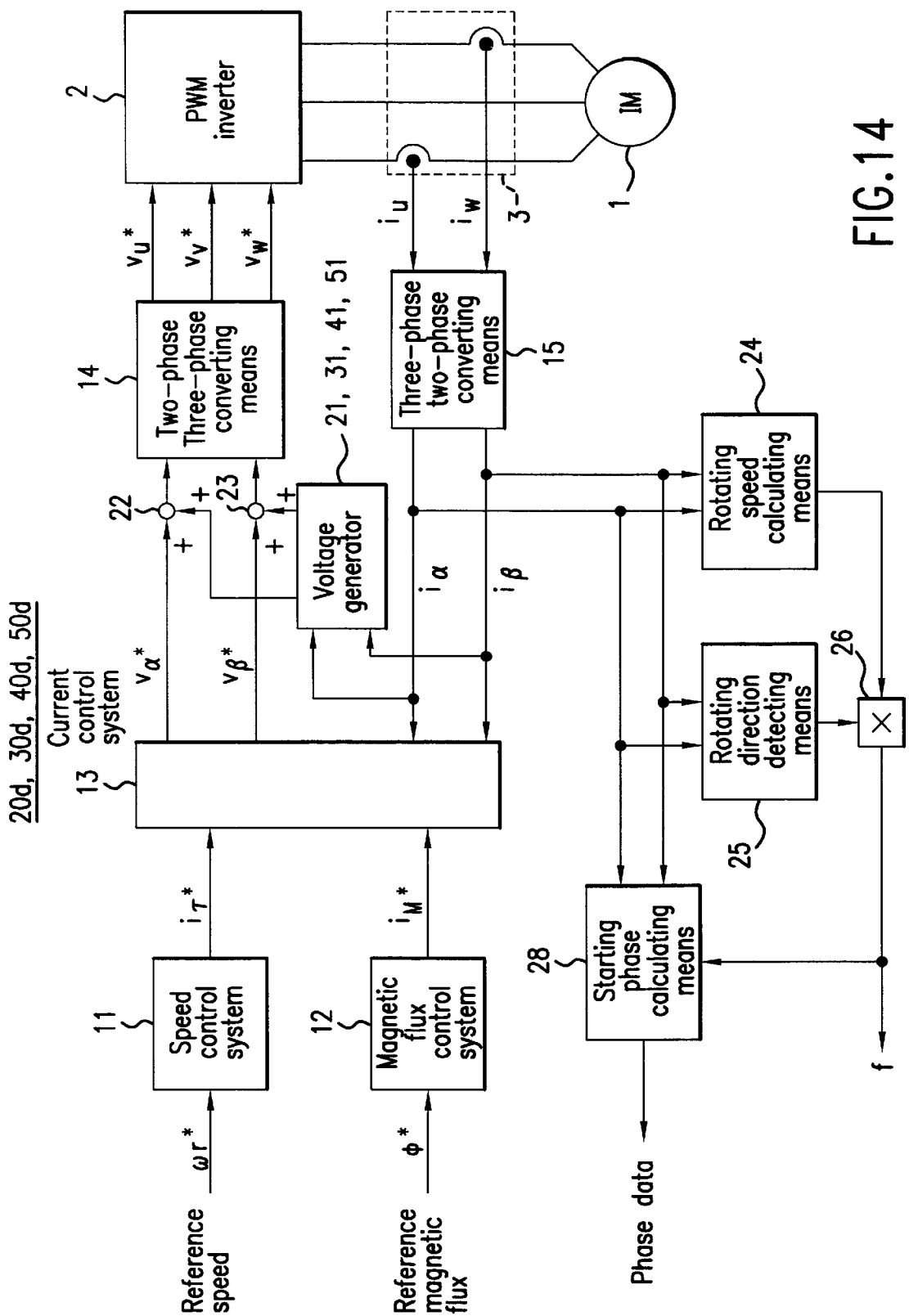
FIG. 14 is a block circuit diagram of a control apparatus for variably controlling a speed of an induction motor according to a ninth embodiment of the invention.

FIG. 14 is a block circuit diagram of a control apparatus for variably controlling a speed of an induction motor according to a ninth embodiment of the invention.

Referring now to FIG. 14, either one of the speed-control apparatuses 20d, 30d, 40d and 50d includes a speed control system 11, a magnetic flux control system 12, a current control system 13, two-phase three-phase converting means 14, and three-phase two-phase converting means 15, a voltage generator 21, 31, 41 or 51, adders 22 and 23, rotating speed calculating means 24, rotating direction detecting means 25, a multiplier 26, and starting phase calculating means 28.

In FIG. 14, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

Then, the starting phase calculating means 28 calculates starting phase data ($\theta_1$, $\theta_1 = \tan^{-1}(i\beta/i\alpha)$) based on the α- and β-axis components of the primary current of the induction motor 1 and the rotating speed data (f).

Initial phases of the reference voltages (Vu*, Vv*. Vw*) are determined based on the starting phase data $\theta_1$. By feeding the reference voltages (Vu*, Vv*. Vw*) with their phases to the PWM inverter 2 to start in response to the start signal, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Figure 15:
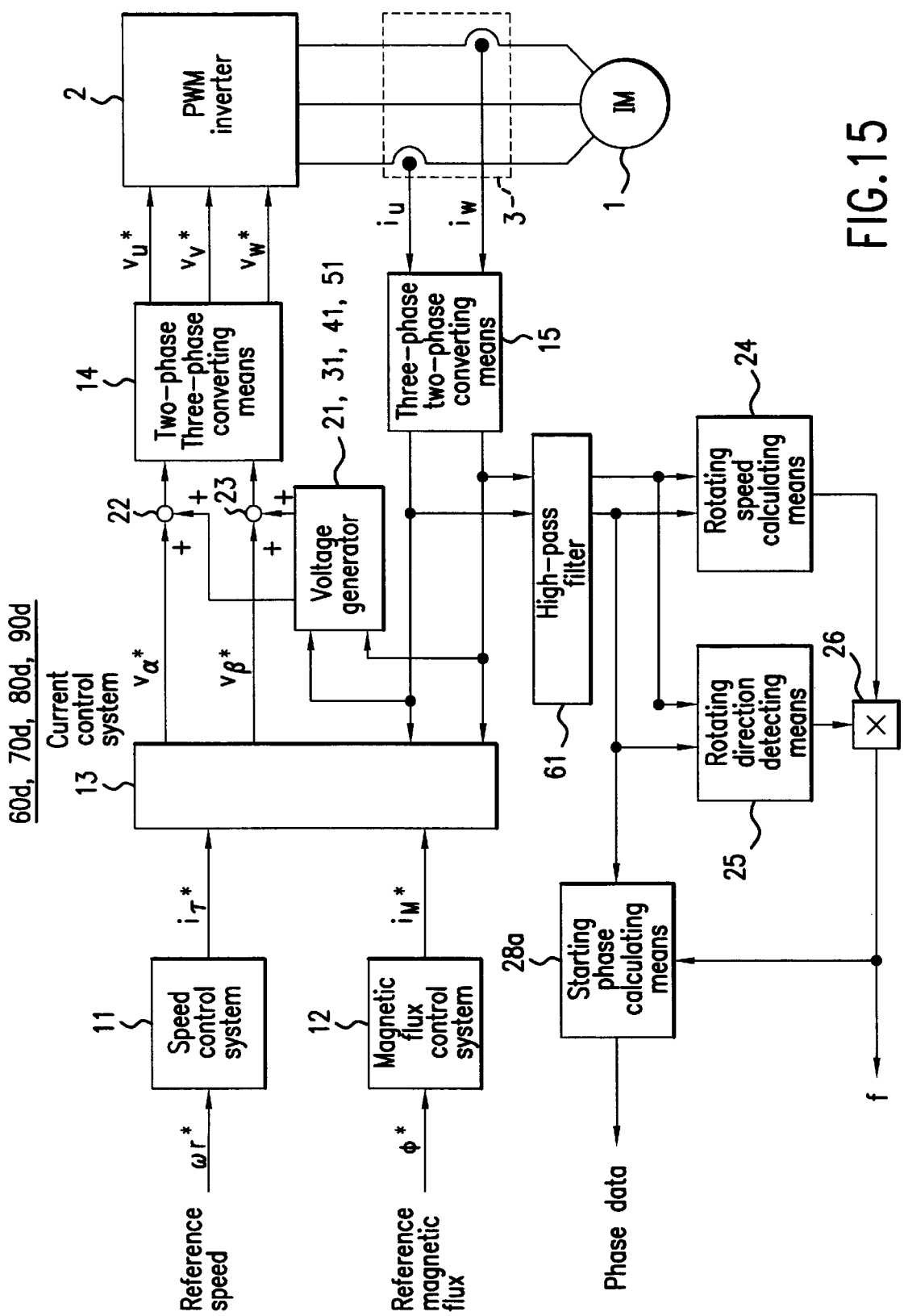
FIG. 15 is a block circuit diagram of a control apparatus for variably controlling a speed of an induction motor according to a tenth embodiment of the invention.

FIG. 15 is a block circuit diagram of a control apparatus for variably controlling the speed of an induction motor according to a tenth embodiment of the invention.

Referring now to FIG. 15, either one of the speed-control apparatuses 60d, 70d, 80d and 90d includes a speed control system 11, a magnetic flux control system 12, a current control system 13, two-phase three-phase converting means 14, three-phase two-phase converting means 15, a voltage generator 21, 31, 41 or 51, adders 22 and 23, rotating speed calculating means 24, rotating direction detecting means 25, a multiplier 26, a high-pass filter 61, and starting phase calculating means 28a.

In FIG. 15, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

Then, the starting phase calculating means 28a calculates starting phase data ($\theta_2$, $\theta_2 \tan^{-1}(i\beta_F i\alpha_F)$) based on the $\alpha$- and $\beta$ axis components of the primary current of the induction motor 1 ($i\alpha_F$ and $i\beta_F$), which are fed via the high-pass filter 61, and the rotating speed data (f). And, corrected starting phase data $\theta_{2F}$ is obtained by correcting the phase delay caused by the high-pass filter 61.

Initial phases of the reference voltages (Vu*, Vv*. Vw*) are determined based on the corrected starting phase data $\theta_{2F}$. By feeding the reference voltages (Vu*, Vv*. Vw*) with their initial phases to the PWM inverter 2 to start in response to the start signal, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Figure 16:
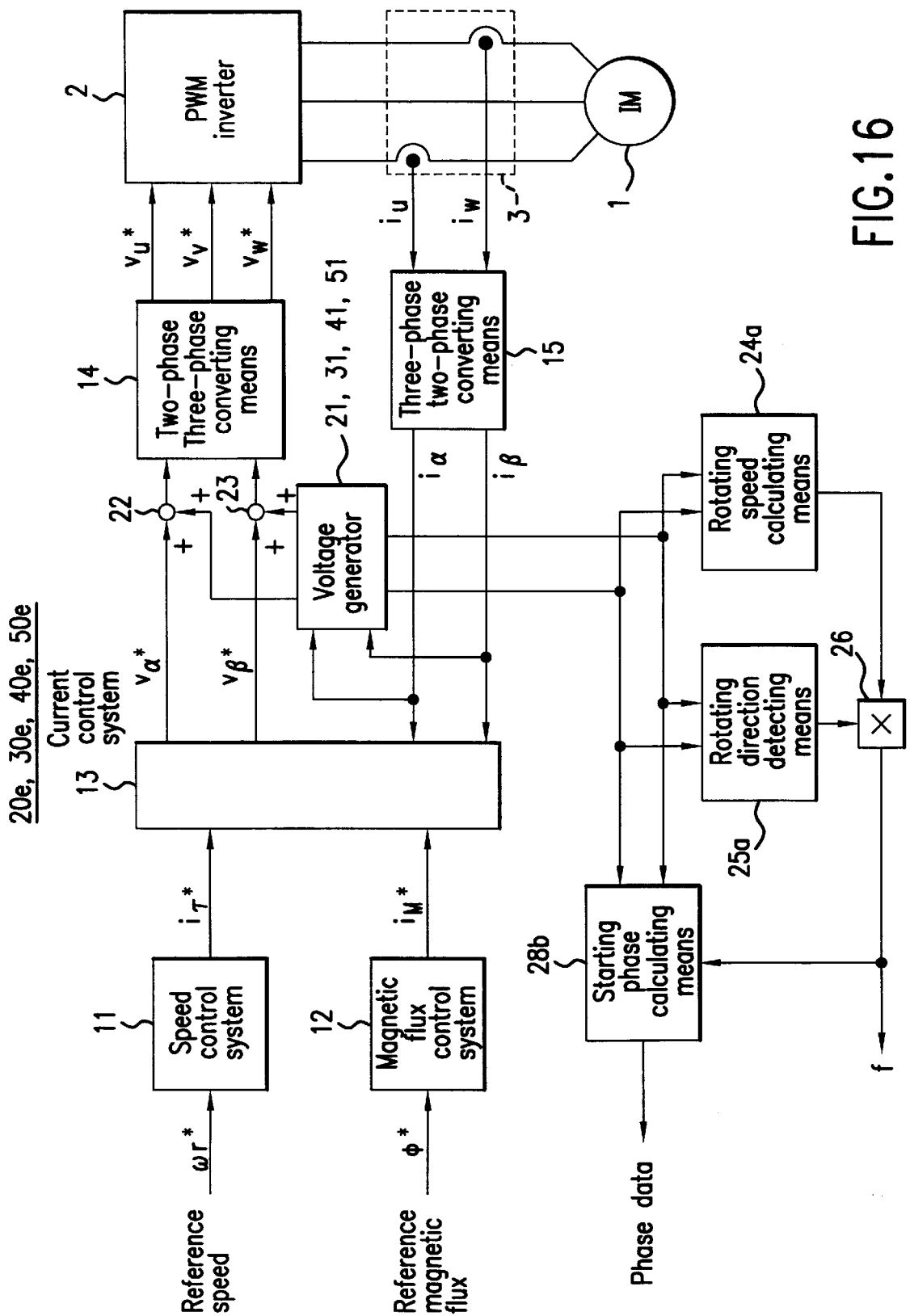
FIG. 16 is a block circuit diagram of a control apparatus for variably controlling a speed of an induction motor according to an eleventh embodiment of the invention.

FIG. 16 is a block circuit diagram of a control apparatus for variably controlling the speed of an induction motor according to an eleventh embodiment of the invention.

Referring now to FIG. 16, either one of the speed-control apparatuses 20e, 30e, 40e and 50e includes a speed control system 11, a magnetic flux control system 12, a current control system 13, two-phase three-phase converting means 14, three-phase two-phase converting means 15, a voltage generator 21, 31, 41 or 51, adders 22 and 23, rotating speed calculating means 24a, rotating direction detecting means 25a, a multiplier 26, and starting phase calculating means 28b.

In FIG. 16, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

Then, the starting phase calculating means 28b calculates starting phase data ($\theta_3$, $\theta_3 = \tan^{-1}(v\beta/v\alpha)$) based on the $\alpha$- and $\beta$-axis components of the integral term on the right side of the equations (4) through (7) ($v\alpha$ and $v\beta$) in the respective voltage generators 21, 31, 41, 51 and the rotating speed data (f).

Initial phases of the reference voltages (Vu*, Vv*. Vw*) are determined based on the starting phase data $\theta_3$. By feeding the reference voltages (Vu*, Vv*. Vw*) with their initial phases to the PWM inverter 2 to start in response to the start signal, a three-phase voltage having a frequency and a phase almost synchronous with the rotation of the induction motor 1 immediately before the start of the PWM inverter 2 is fed to the induction motor 1. Thus, the PWM inverter 2 is started without any shock.

Figure 17:
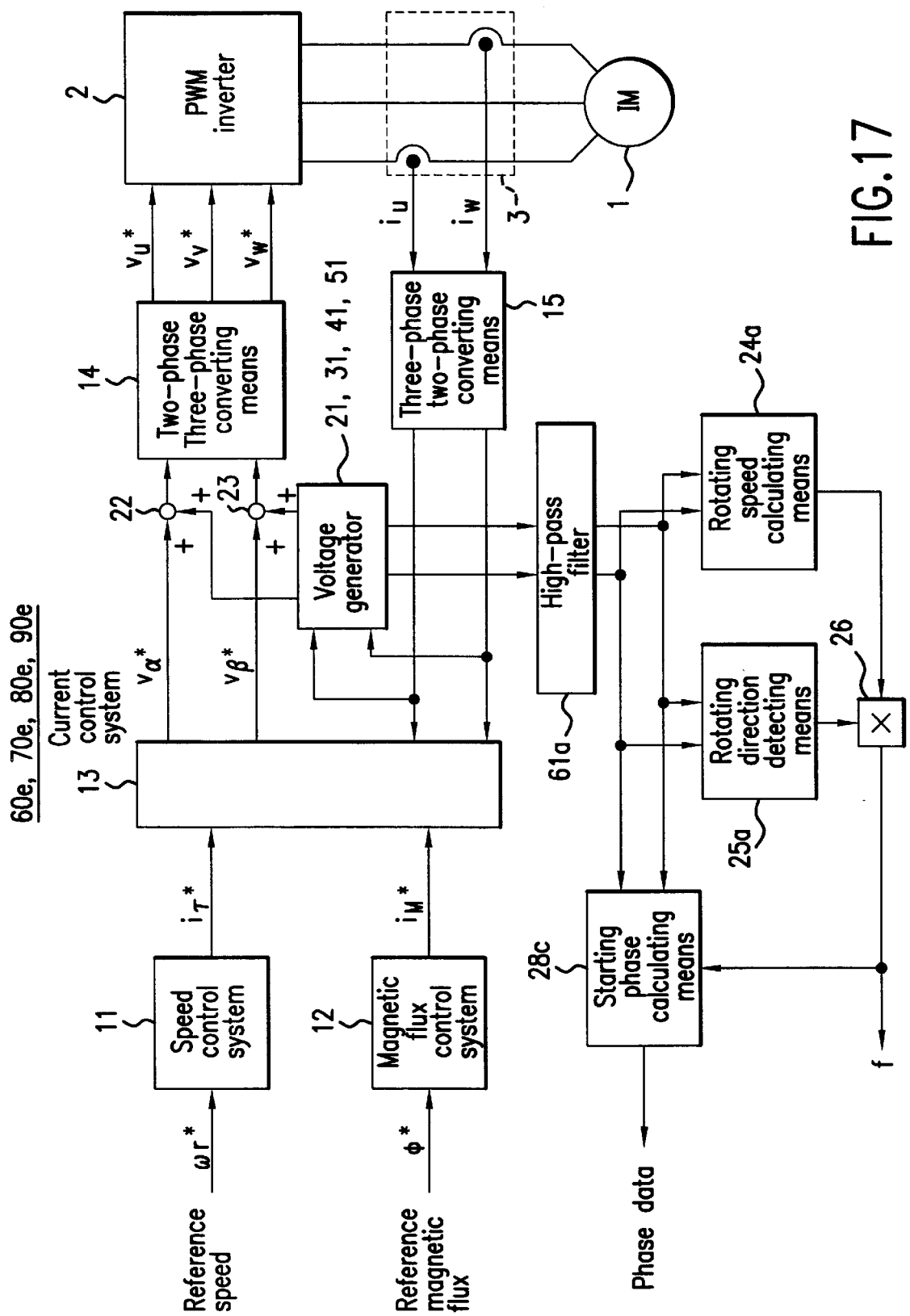
FIG. 17 is a block circuit diagram of a control apparatus for variably controlling a speed of an induction motor according to a twelfth embodiment of the invention.

FIG. 17 is a block circuit diagram of a control apparatus for variably controlling the speed of an induction motor according to a twelfth embodiment of the invention.

Referring now to FIG. 17, either one of the speed-control apparatuses 60e, 70e, 80e and 90e includes a speed control system 11, a magnetic flux control system 12, a current control system 13, two-phase three-phase converting means 14, three-phase two-phase converting means 15, a voltage generator 21, 31, 41 or 51, adders 22 and 23, rotating speed calculating means 24a, rotating direction detecting means 25a, a multiplier 26, a high-pass filter 61a, and starting phase calculating means 28c.

In FIG. 17, for starting the PWM inverter 2 or for restarting the PWM inverter 2 after an AC power supply (not shown) has recovered from a momentary service interruption, either one of the foregoing voltage generators is operated for a predetermined period of time and the rotating speed data (f) is obtained during the predetermined period of time.

Then, the starting phase calculating means 28c calculates starting phase data ($\theta_4$, $\theta_4 = \tan^{-1}(v\beta_F/v\alpha_F)$) based on the $\alpha$- and $\beta$-axis components of the integral term on the right side of the equations (4) through (7) ($v\alpha_F$ and $v\beta_F$), which are fed from the respective voltage generators 21, 31, 41 and 51 via the high-pass filter 61a, and the rotating speed data (f). And, corrected starting phase data $\theta_{4F}$ is obtained by correcting the phase delay caused by the high-pass filter 61a.

Initial phases of the reference voltages (Vu*, Vv*. Vw*) are determined based on the corrected phased data $\theta_{4F}$. By feeding the reference voltages (Vu*, Vv*. Vw*) with their initial phases to the PWM inverter 2 to start in response to the start signal, a three-phase voltage having a frequency and a phase almost synchronous with the rotation of the induction motor 1 immediately before the start of the PWM inverter 2 is fed to the induction motor 1. Thus, the PWM inverter 2 is started without any shock.

The control apparatus for variably controlling the speed of the induction motor of the invention triggers self-excited oscillation using a voltage including an arbitrary frequency component as an initial voltage value. The speed-control apparatus according to the invention facilitates detecting with high reliability the rotating speed data and rotating direction of the induction motor even when the induction motor is rotating at a low speed. Thus, the speed-control apparatus of the invention prevents the PWM inverter from urgent stop due to overload and unnecessary shock from being exerted to the induction motor. Since it is not necessary to employ any high-speed microcomputer for conducting the pertinent operations, a cheap speed-control apparatus can be made.

What is claimed is:

1. A control apparatus for variably controlling a speed of an induction motor, comprising:

a voltage generator for self-excited oscillation outputting $\alpha$- and $\beta$-axis reference voltages on an $\alpha$-axis and a $\beta$-axis perpendicular to each other on a stationary coordinate;

a PWM inverter for converting a fed AC power supply to an alternating current having a desired frequency and a desired voltage and for feeding a converted alternating current to the induction motor, said PWM inverter being electrically connected to the voltage generator and the induction motor and feeding a voltage to the induction motor for self-excited oscillation for a primary current of the induction motor based on the $\alpha$- and $\beta$-axis reference voltages; and rotating speed calculating means electrically connected to the induction motor, said rotating speed calculating means detecting a frequency of at least one of $\alpha$- and $\beta$-axis components of the self-excited and oscillating primary current of the induction motor, and calculating rotating speed data of the induction motor based on the detected frequency to thereby start the PWM inverter based on the calculated rotating speed data.

2. A control apparatus according to claim 1, further comprising a high-pass filter, through which the α- and β-axis components of the self-excited and oscillating primary current of the induction motor are inputted to the rotating speed calculating means.

3. A control apparatus according to claim 1, further comprising starting phase calculating means electrically connected to the induction motor, said starting phase calculating means calculating start information of the PWM inverter based on at least one of the α- and β-axis components of the primary current and the calculated rotating speed data to thereby start the PWM inverter based on the calculated start information in addition to the calculated rotating speed data.

4. A control apparatus according to claim 3, wherein said start information includes a start timing and starting phase data, and said start of the PWM inverter includes restarting the PWM inverter after the AC power supply has recovered from a momentary service interruption.

5. A control apparatus according to claim 3, further comprising a high-pass filter, through which the α- and β-axis components of the self-excited and oscillating primary current of the induction motor are inputted to the rotating speed calculating means and the starting phase calculating means.

6. A control apparatus according to claim 1, further comprising rotating direction detecting means electrically connected to the induction motor, said rotating direction detecting means detecting a rotating direction of the induction motor based on a phase relation between the α- and β-axis components of the primary current to thereby start the PWM inverter based on the detected rotating direction in addition to the calculated rotating speed data.

7. A control apparatus according to claim 6, further comprising a high-pass filter, through which the α- and β-axis components of the self-excited and oscillating primary current of the induction motor are inputted to the rotating speed calculating means and the rotating direction detecting means.

8. A control apparatus according to claim 6, further comprising starting phase calculating means electrically connected to the induction motor, said starting phase calculating means calculating start information of the PWM inverter based on at least one of the α- and β-axis components of the primary current and the calculated rotating speed data to thereby start the PWM inverter based on the calculated start information in addition to the calculated rotating speed data and the detected rotating direction.

9. A control apparatus according to claim 1, wherein the voltage generator comprises:
a first induction motor model calculating a first voltage from the α-axis reference voltage;
a first adder electrically connected to the first induction motor model, said first adder calculating a first voltage difference between the first voltage and a voltage obtained by multiplying the α-axis component of the primary current of the induction motor and a first feedback gain;
a first limiter electrically connected to the first adder, said first limiter limiting the first voltage difference and outputting the limited first voltage difference as the α-axis reference voltage;
a second induction motor model calculating a second voltage from the β-axis reference voltage;

a second adder electrically connected to the second induction motor model, said second adder calculating a second voltage difference between the second voltage and a voltage obtained by multiplying the β-axis component of the primary current of the induction motor and a second feedback gain;
a second limiter electrically connected to the second adder, said second limiter limiting the second voltage difference and lot outputting the limited second voltage difference as the β-axis reference voltage; and
an initial voltage generator electrically connected to one of the first adder and the second adder to output an initial voltage thereto.

10. A control apparatus according to claim 1, wherein the voltage generator comprises:
a first induction motor model for calculating a first voltage from the α-axis reference voltage and the α-axis component of the primary current of the induction motor;
a first limiter electrically connected to the first induction motor model for limiting the first voltage;
a first adder electrically connected to the first limiter, said first adder calculating a first voltage difference between the limited first voltage and a voltage obtained by multiplying the α-axis component of the primary current of the induction motor and a first feedback gain, and outputting the calculated first voltage difference as the α-axis reference voltage;
a second induction motor model calculating a second voltage from the β-axis reference voltage and the β-axis component of the primary current of the induction motor;
a second limiter electrically connected to the second induction motor model for limiting the second voltage;
a second adder electrically connected to the second limiter, said second adder calculating a second voltage difference between the limited second voltage and a voltage obtained by multiplying the β-axis component of the primary current of the induction motor and a second feedback gain, and outputting the calculated second voltage difference as the β-axis reference voltage;
a third adder inserted in one of two paths, one path being located between the first induction motor model and the first limiter and the other path being located between the second induction motor model and the second limiter; and
an initial voltage generator electrically connected to the third adder for adding an output of the initial voltage generator to an output of one of the first and second induction motor models.

11. A control apparatus according to claim 1, wherein the voltage generator comprises:
a first adder;
a first induction motor model electrically connected to the first adder for calculating a first voltage from an output of the first adder;
a first limiter situated between the first adder and the first induction motor model, said first limiter limiting the first voltage outputted from the first induction motor model and providing an output to the first adder so that the first adder calculates a first voltage difference between the limited first voltage and a voltage obtained by multiplying the α-axis component of the primary current of the induction motor and a first feedback gain;
a second adder electrically connected to the first adder, said second adder adding the first voltage difference and an α-axis compensation voltage obtained by multiplying the α-axis component of the primary current and a primary resistance of the induction motor, and outputting a result of adding as the α-axis reference voltage;

a third adder;

a second induction motor model electrically connected to the third adder for calculating a second voltage from an output of the third adder;

a second limiter situated between the third adder and the second induction motor model, said second limiter limiting the second voltage outputted from the second induction motor model and providing an output to the third adder so that the third adder calculates a second voltage difference between the limited second voltage and a voltage obtained by multiplying the β-axis component of the primary current of the induction motor and a second feedback gain;

a fourth adder electrically connected to the third adder, said fourth adder adding the second voltage difference and a β-axis compensation voltage obtained by multiplying the β-axis component of the primary current and a primary resistance of the induction motor, and outputting a result of adding as the β-axis reference voltage;

a fifth adder inserted in one of two paths, one being located between the first induction motor model and the first limiter and the other being located between the second induction motor model and the second limiter; and an initial voltage generator electrically connected to the fifth adder, said fifth adder adding an output of the initial voltage generator and one of the first and second voltages.

12. A control apparatus according to claim 1, wherein the voltage generator comprises:

a first current regulator;

a first induction motor model electrically connected to the first current regulator for calculating a first voltage from an output of the first current regulator;

a first limiter electrically connected to the first induction motor model for limiting the first voltage outputted from the first induction motor model;

a first adder situated between the first current regulator and the first limiter, said first adder calculating a first voltage difference between the limited first voltage and the α-axis component of the primary current of the induction motor;

a second adder electrically connected to the first current regulator, said second adder adding the first voltage difference and an α-axis compensation voltage obtained by multiplying the α-axis component of the primary current and a primary resistance of the induction motor, and outputting a result of adding as the α-axis reference voltage;

a second current regulator;

a second induction motor model electrically connected to the second current regulator for calculating a second voltage from an output of the second current regulator;

a second limiter electrically connected to the second induction motor model for limiting the second voltage outputted from the second induction motor model;

a third adder situated between the second current regulator and the second limiter, said third adder calculating a second voltage difference between the limited second voltage and the β-axis component of the primary current of the induction motor;

a fourth adder electrically connected to the second current regulator, said fourth adder adding the second voltage difference and a β-axis compensation voltage obtained by multiplying the β-axis component of the primary current and a primary resistance of the induction motor, and outputting a result of adding as the β-axis reference voltage; and an initial voltage generator connected to one of the first adder and the third adder.

13. A control apparatus for variably controlling a speed of an induction motor, comprising:

a voltage generator for self-excited oscillation outputting α- and β-axis reference voltages on an α-axis and a β-axis perpendicular to each other on a stationary coordinate;

a PWM inverter for converting a fed AC power supply to an alternating current having a desired frequency and a desired voltage and for feeding a converted alternating current to the induction motor, said PWM inverter being electrically connected to the voltage generator and the induction motor and feeding a voltage to the induction motor for the self-excited oscillation for a primary current of the induction motor based on the α- and β-axis reference voltages; and rotating speed calculating means electrically connected to the voltage generator, said rotating speed calculating means detecting a frequency of at least one of α- and β-axis calculation values calculated in the voltage generator, and calculating rotating speed data of the induction motor based on the detected frequency to thereby start the PWM inverter based on the calculated rotating speed data.

14. A control apparatus according to claim 13, further comprising a high-pass filter inserted between the voltage generator and the rotating speed calculating means.

15. A control apparatus according to claim 13, further comprising starting phase calculating means electrically connected to the voltage generator, said starting phase calculating means calculating start information of the PWM inverter based on the at least one of the α- and β-axis calculation values and the calculated rotating speed data to thereby start the PWM inverter based on the calculated start information in addition to the calculated rotating speed data.

16. A control apparatus according to claim 15, wherein said start information includes a start timing and starting phase data, and said start of the PWM inverter includes restarting the PWM inverter after the AC power supply has recovered from a momentary service interruption.

17. A control apparatus according to claim 15, further comprising a high-pass filter inserted in paths connecting the voltage generator with the rotating speed calculating means and the starting phase calculating means.

18. A control apparatus according to claim 13, further comprising rotating direction detecting means electrically connected to the voltage generator, said rotating direction detecting means detecting a rotating direction of the induction motor based on a phase relation between the α- and β-axis calculation values to thereby start the PWM inverter based on the detected rotating direction in addition to the calculated rotating speed data.

19. A control apparatus according to claim 18, further comprising a high-pass filter inserted in paths connecting the voltage generator with the rotating speed calculating means and the rotating direction detecting means.

20. A control apparatus according to claim 17, further comprising starting phase calculating means electrically connected to the voltage generator, said starting phase calculating means calculating start information of the PWM inverter based on the at least one of the α- and β-axis calculation values and the calculated rotating speed data to thereby start the PWM inverter based on the calculated start information in addition to the calculated rotating speed data and the detected rotating direction.

21. A control apparatus according to claim 13, wherein the voltage generator comprises:
   a first induction motor model calculating a first voltage from the α-axis reference voltage;
   a first adder electrically connected to the first induction motor model, said first adder calculating a first voltage difference between the first voltage and a voltage obtained by multiplying the α-axis component of the primary current of the induction motor and a first feedback gain;
   a first limiter electrically connected to the first adder, said first limiter limiting the first voltage difference and outputting the limited first voltage difference as the α-axis reference voltage;
   a second induction motor model calculating a second voltage from the β-axis reference voltage;
   a second adder electrically connected to the second induction motor model, said second adder calculating a second voltage difference between the second voltage and a voltage obtained by multiplying the β-axis component of the primary current of the induction motor and a second feedback gain;
   a second limiter electrically connected to the second adder, said second limiter limiting the second voltage difference and outputting the limited second voltage difference as the β-axis reference voltage; and
   an initial voltage generator electrically connected to one of the first adder and the second adder to output an initial voltage thereto.

22. A control apparatus according to claim 13, wherein the voltage generator comprises:
   a first induction motor model for calculating a first voltage from the α-axis reference voltage and the α-axis component of the primary current of the induction motor;
   a first limiter electrically connected to the first induction motor model for limiting the first voltage;
   a first adder electrically connected to the first limiter, said first adder calculating a first voltage difference between the limited first voltage and a voltage obtained by multiplying the α-axis component of the primary current of the induction motor and a first feedback gain, and outputting the calculated first voltage difference as the α-axis reference voltage;
   a second induction motor model calculating a second voltage from the β-axis reference voltage and the β-axis component of the primary current of the induction motor;
   a second limiter electrically connected to the second induction motor model for limiting the second voltage;
   a second adder electrically connected to the second limiter, said second adder calculating a second voltage difference between the limited second voltage and a voltage obtained by multiplying the β-axis component of the primary current of the induction motor and a second feedback gain, and outputting the calculated second voltage difference as the β-axis reference voltage;
   a third adder inserted in one of two paths, one path being located between the first induction motor model and the first limiter and the other path being located between the second induction motor model and the second limiter; and
   an initial voltage generator electrically connected to the third adder for adding an output of the initial voltage generator to an output of one of the first and second induction motor models.

23. A control apparatus according to claim 13, wherein the voltage generator comprises:
   a first adder;
   a first induction motor model electrically connected to the first adder for calculating a first voltage from an output of the first adder;
   a first limiter situated between the first adder and the first induction motor model, said first limiter limiting the first voltage outputted from the first induction motor model and providing an output to the first adder so that the first adder calculates a first voltage difference between the limited first voltage and a voltage obtained by multiplying the α-axis component of the primary current of the induction motor and a first feedback gain;
   a second adder electrically connected to the first adder, said second adder adding the first voltage difference and an α-axis compensation voltage obtained by multiplying the α-axis component of the primary current and a primary resistance of the induction motor, and outputting a result of adding as the α-axis reference voltage;
   a third adder;
   a second induction motor model electrically connected to the third adder for calculating a second voltage from an output of the third adder;
   a second limiter situated between the third adder and the second induction motor model, said second limiter limiting the second voltage outputted from the second induction motor model and providing an output to the third adder so that the third adder calculates a second voltage difference between the limited second voltage and a voltage obtained by multiplying the β-axis component of the primary current of the induction motor and a second feedback gain;
   a fourth adder electrically connected to the third adder, said fourth adder adding the second voltage difference and a β-axis compensation voltage obtained by multiplying the β-axis component of the primary current and a primary resistance of the induction motor, and outputting a result of adding as the β-axis reference voltage;
   a fifth adder inserted in one of two paths, one being located between the first induction motor model and the first limiter and the other being located between the second induction motor model and the second limiter; and
   an initial voltage generator electrically connected to the fifth adder, said fifth adder adding an output of the initial voltage generator and one of the first and second voltages.

24. A control apparatus according to claim 13, wherein the voltage generator comprises:
   a first current regulator;
   a first induction motor model electrically connected to the first current regulator for calculating a first voltage from an output of the first current regulator;

- a first limiter electrically connected to the first induction motor model for limiting the first voltage outputted from the first induction motor model;
- a first adder situated between the first current regulator and the first limiter, said first adder calculating a first voltage difference between the limited first voltage and the α-axis component of the primary current of the induction motor;
- a second adder electrically connected to the first current regulator, said second adder adding the first voltage difference and an α-axis compensation voltage obtained by multiplying the α-axis component of the primary current and a primary resistance of the induction motor, and outputting a result of adding as the α-axis reference voltage;
- a second current regulator;
- a second induction motor model electrically connected to the second current regulator for calculating a second voltage from an output of the second current regulator;
- a second limiter electrically connected to the second induction motor model for limiting the second voltage outputted from the second induction motor model;
- a third adder situated between the second current regulator and the second limiter, said third adder calculating a second voltage difference between the limited second voltage and the β-axis component of the primary current of the induction motor;
- a fourth adder electrically connected to the second current regulator, said fourth adder adding the second voltage difference and a β-axis compensation voltage obtained by multiplying the β-axis component of the primary current and a primary resistance of the induction motor, and outputting a result of adding as the β-axis reference voltage; and
- an initial voltage generator connected to one of the first adder and the third adder.

* * * * *

UNITED STATES PATENT AND TRADEMARK OFFICE
CERTIFICATE OF CORRECTION

PATENT : 6,060,860
DATED : May 9, 2000
INVENTOR(S) : Junichi Itoh; Hidetoshi Umida; and Hiroyuki Yonezawa It is certified that error appears in the above-identified patent and that said Letters Patent is hereby corrected as shown below:

On the title page, Item [54], after "SPEED" add --OF--;

In column 1, line 2, after "speed" add --of--;

In column 2, line 6, change "1" to --2--;

In column 7, line 42, change "fist" to --first--;

In column 13, line 53, change "Sid" to --51d--; and

In column 22, line 9, delete "lot".

Signed and Sealed this

Twentieth Day of March, 2001

Attest:

NICHOLAS P. GODICI

*Attesting Officer*  *Acting Director of the United States Patent and Trademark Office*